(12) United States Patent
Aggarwal et al.

(10) Patent No.: US 9,645,225 B2
(45) Date of Patent: May 9, 2017

(54) NETWORK-CENTRIC DETERMINATION OF NODE PROCESSING DELAY

(75) Inventors: Alok Aggarwal, Foster City, CA (US); Ayman Fawzy Naguib, Cupertino, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 919 days.

(21) Appl. No.: 12/622,356

(22) Filed: Nov. 19, 2009

(65) Prior Publication Data
US 2010/0128637 A1    May 27, 2010

Related U.S. Application Data

(60) Provisional application No. 61/117,020, filed on Nov. 21, 2008.

(51) Int. Cl.
*G01S 5/02*    (2010.01)
*G01S 5/06*    (2006.01)
(Continued)

(52) U.S. Cl.
CPC ............ *G01S 5/021* (2013.01); *G01S 5/0284* (2013.01); *G01S 5/06* (2013.01);
(Continued)

(58) Field of Classification Search
CPC .......... G01S 5/06; G01S 5/0284; G01S 5/021; H04W 24/00; H04W 4/04; H04W 64/00; H04L 29/08657
(Continued)

(56) References Cited

U.S. PATENT DOCUMENTS 6,181,253 B1    1/2001 Eschenbach et al.
6,477,380 B1    11/2002 Uehara et al.
(Continued)

FOREIGN PATENT DOCUMENTS

CN    1269947 A    10/2000
CN    1444833 A    9/2003
(Continued)

OTHER PUBLICATIONS

"Comparison of Indoor Geolocation Methods in DSSS and OFDM Wireless LAN Systems", Xinrong Li and Kaveh Pahlavan, Vehicular Technology Conference, 2000. IEEE VTC 2000, vol. 6, Sep. 24, 2000.*

(Continued)

*Primary Examiner* — Alpus H Hsu
*Assistant Examiner* — Anthony Luo
(74) *Attorney, Agent, or Firm* — Mahmoud Munes Tomeh

(57) ABSTRACT

Apparatus and methods are directed to calibrating a delay within a wireless access point for determining a position of a mobile station. One method includes receiving an initial packet at an eavesdropping device, receiving a response packet, sent by another entity, at the eavesdropping device, computing a time difference based upon the packet arrival times, and providing the time difference to a position determination entity. Another method includes providing a request to appropriate eavesdropping devices to send information, receiving, from each appropriate eavesdropping device, a time difference which represents a difference in a time of arrival of a packet transmitted by the wireless access point and a time of arrival of a packet transmitted by the mobile station, determining a processing delay estimate based upon the time differences, and determining a position of the mobile station based upon the processing delay estimate and the received time differences.

54 Claims, 9 Drawing Sheets

(51) Int. Cl.
  *H04W 4/04* (2009.01)
  *H04W 64/00* (2009.01)
  *H04L 29/08* (2006.01)

(52) U.S. Cl.
  CPC ......... *H04L 29/08657* (2013.01); *H04W 4/04* (2013.01); *H04W 64/00* (2013.01)

(58) Field of Classification Search
  USPC .................................. 370/328, 338; 455/456
  See application file for complete search history.

(56) References Cited

U.S. PATENT DOCUMENTS

| | | | |
|---|---|---|---|
| 6,681,099 B1 | 1/2004 | Keranen et al. | |
| 6,754,488 B1 | 6/2004 | Won et al. | |
| 7,079,851 B2 | 7/2006 | Makuta | |
| 7,130,646 B2 | 10/2006 | Wang | |
| 7,138,946 B2 | 11/2006 | Tamaki et al. | |
| 7,233,800 B2 | 6/2007 | Laroia et al. | |
| 7,319,878 B2 | 1/2008 | Sheynblat et al. | |
| 7,346,120 B2 | 3/2008 | McCorkle | |
| 7,373,156 B2 * | 5/2008 | Ruutu et al. ............... | 455/456.2 |
| 7,383,049 B2 | 6/2008 | Deloach, Jr. et al. | |
| 7,469,139 B2 | 12/2008 | van de Groenendaal | |
| 7,525,484 B2 | 4/2009 | Dupray et al. | |
| 7,574,216 B2 | 8/2009 | Leitch et al. | |
| 7,672,283 B1 | 3/2010 | Chang et al. | |
| 7,676,218 B2 | 3/2010 | Ballai | |
| 7,716,740 B2 | 5/2010 | Robert et al. | |
| 7,751,829 B2 * | 7/2010 | Masuoka et al. .......... | 455/456.1 |
| 7,756,615 B2 | 7/2010 | Barfoot et al. | |
| 7,810,154 B2 | 10/2010 | Hum et al. | |
| 7,861,123 B1 | 12/2010 | Tamilarasan et al. | |
| 7,893,873 B2 | 2/2011 | Black et al. | |
| 7,899,006 B2 * | 3/2011 | Boyd ............................ | 370/328 |
| 7,941,159 B2 | 5/2011 | Walley et al. | |
| 7,983,622 B1 | 7/2011 | Vaughan | |
| 8,032,153 B2 | 10/2011 | Karr et al. | |
| 8,045,996 B2 | 10/2011 | Brunner et al. | |
| 8,161,316 B1 | 4/2012 | Manning et al. | |
| 8,165,150 B2 | 4/2012 | Aweya et al. | |
| 8,238,942 B2 | 8/2012 | Gast et al. | |
| 8,244,272 B2 | 8/2012 | Morgan et al. | |
| 8,265,652 B2 | 9/2012 | Piersol et al. | |
| 2001/0053699 A1 | 12/2001 | McCrady et al. | |
| 2002/0118723 A1 | 8/2002 | McCrady et al. | |
| 2002/0173295 A1 | 11/2002 | Nykanen et al. | |
| 2003/0125046 A1 | 7/2003 | Riley et al. | |
| 2003/0129995 A1 | 7/2003 | Niwa | |
| 2003/0182053 A1 | 9/2003 | Swope et al. | |
| 2004/0003285 A1 | 1/2004 | Whelan et al. | |
| 2004/0023640 A1 | 2/2004 | Ballai | |
| 2004/0104842 A1 | 6/2004 | Drury et al. | |
| 2004/0189712 A1 | 9/2004 | Rundell | |
| 2004/0203539 A1 | 10/2004 | Benes et al. | |
| 2004/0203931 A1 | 10/2004 | Karaoguz | |
| 2004/0223599 A1 | 11/2004 | Bear et al. | |
| 2004/0235499 A1 | 11/2004 | Tanaka et al. | |
| 2004/0258012 A1 | 12/2004 | Ishii | |
| 2004/0266457 A1 * | 12/2004 | Dupray ..................... | 455/456.5 |
| 2005/0055412 A1 | 3/2005 | Kaminsky et al. | |
| 2005/0058081 A1 | 3/2005 | Elliott | |
| 2005/0130669 A1 | 6/2005 | Mizugaki et al. | |
| 2005/0130699 A1 | 6/2005 | Kim et al. | |
| 2005/0201533 A1 | 9/2005 | Emam et al. | |
| 2005/0208900 A1 | 9/2005 | Karacaoglu | |
| 2006/0004911 A1 | 1/2006 | Becker et al. | |
| 2006/0012476 A1 | 1/2006 | Markhovsky et al. | |
| 2006/0085581 A1 | 4/2006 | Martin | |
| 2006/0090169 A1 | 4/2006 | Daniels et al. | |
| 2006/0120334 A1 * | 6/2006 | Wang et al. ................. | 370/338 |
| 2006/0187028 A1 | 8/2006 | Kiang et al. | |
| 2006/0189329 A1 | 8/2006 | Anderson et al. | |
| 2006/0195252 A1 | 8/2006 | Orr et al. | |
| 2006/0200862 A1 | 9/2006 | Olson et al. | |
| 2006/0256838 A1 | 11/2006 | Yarkosky | |
| 2007/0002813 A1 | 1/2007 | Tenny et al. | |
| 2007/0063896 A1 | 3/2007 | Alban et al. | |
| 2007/0078905 A1 | 4/2007 | Gunther et al. | |
| 2007/0099646 A1 | 5/2007 | Tanaka et al. | |
| 2007/0115842 A1 | 5/2007 | Matsuda et al. | |
| 2007/0121560 A1 | 5/2007 | Edge | |
| 2007/0136686 A1 | 6/2007 | Price et al. | |
| 2007/0200759 A1 | 8/2007 | Heidari-Bateni et al. | |
| 2007/0265020 A1 * | 11/2007 | Cuffaro ..................... | 455/456.5 |
| 2007/0270168 A1 | 11/2007 | Sheynblat | |
| 2008/0002820 A1 | 1/2008 | Shtiegman et al. | |
| 2008/0034435 A1 | 2/2008 | Grabarnik et al. | |
| 2008/0068257 A1 | 3/2008 | Mizuochi | |
| 2008/0069318 A1 | 3/2008 | McClung | |
| 2008/0085699 A1 | 4/2008 | Hirano et al. | |
| 2008/0097966 A1 * | 4/2008 | Choi et al. .................. | 707/3 |
| 2008/0101227 A1 | 5/2008 | Fujita et al. | |
| 2008/0101277 A1 * | 5/2008 | Taylor et al. .................. | 370/328 |
| 2008/0180315 A1 | 7/2008 | Tarlow et al. | |
| 2008/0198811 A1 | 8/2008 | Deshpande et al. | |
| 2008/0232297 A1 | 9/2008 | Mizugaki et al. | |
| 2008/0250498 A1 | 10/2008 | Butti et al. | |
| 2008/0287056 A1 | 11/2008 | van de Groenendaal | |
| 2008/0287139 A1 | 11/2008 | Carlson et al. | |
| 2008/0291883 A1 | 11/2008 | Seok | |
| 2008/0299993 A1 | 12/2008 | Gordon et al. | |
| 2008/0301262 A1 * | 12/2008 | Kinoshita et al. ............ | 709/219 |
| 2009/0011713 A1 | 1/2009 | Abusubaih et al. | |
| 2009/0059797 A1 | 3/2009 | Northcutt et al. | |
| 2009/0135797 A1 | 5/2009 | Zhang et al. | |
| 2009/0257426 A1 | 10/2009 | Hart et al. | |
| 2009/0286549 A1 * | 11/2009 | Canon et al. ............... | 455/456.1 |
| 2010/0002776 A1 * | 1/2010 | Youssef et al. ............... | 370/338 |
| 2010/0067393 A1 | 3/2010 | Sakimura et al. | |
| 2010/0081451 A1 | 4/2010 | Mueck et al. | |
| 2010/0128617 A1 | 5/2010 | Aggarwal et al. | |
| 2010/0130229 A1 | 5/2010 | Sridhara et al. | |
| 2010/0130230 A1 | 5/2010 | Aggarwal et al. | |
| 2010/0134348 A1 | 6/2010 | Mizuochi | |
| 2010/0135178 A1 | 6/2010 | Aggarwal et al. | |
| 2010/0141515 A1 | 6/2010 | Doucet et al. | |
| 2010/0157848 A1 | 6/2010 | Das et al. | |
| 2010/0159958 A1 | 6/2010 | Naguib et al. | |
| 2010/0172259 A1 | 7/2010 | Aggarwal et al. | |
| 2011/0092226 A1 | 4/2011 | Maher et al. | |
| 2011/0110293 A1 | 5/2011 | Hart et al. | |
| 2011/0173674 A1 | 7/2011 | Thomson et al. | |
| 2011/0217987 A1 | 9/2011 | Van De Groenendaal | |
| 2011/0269478 A1 | 11/2011 | Das et al. | |
| 2012/0129461 A1 | 5/2012 | Venkatraman | |
| 2012/0269170 A1 | 10/2012 | Chen et al. | |
| 2013/0072227 A1 | 3/2013 | Morgan et al. | |
| 2013/0072228 A1 | 3/2013 | Naguib et al. | |
| 2013/0121173 A1 | 5/2013 | Chen et al. | |
| 2013/0143497 A1 | 6/2013 | Das et al. | |
| 2013/0170374 A1 | 7/2013 | Aljadeff | |
| 2013/0223261 A1 | 8/2013 | Aggarwal et al. | |
| 2013/0237246 A1 | 9/2013 | Aggarwal et al. | |
| 2013/0286959 A1 | 10/2013 | Lou et al. | |
| 2014/0018065 A1 | 1/2014 | Naguib et al. | |
| 2014/0269400 A1 | 9/2014 | Aldana et al. | |
| 2015/0031402 A1 | 1/2015 | Sridhara et al. | |

FOREIGN PATENT DOCUMENTS

| | | |
|---|---|---|
| CN | 1509561 A | 6/2004 |
| CN | 1575017 A | 2/2005 |
| CN | 1606840 A | 4/2005 |
| CN | 1747605 A | 3/2006 |
| CN | 1783810 A | 6/2006 |
| CN | 1914939 A | 2/2007 |
| CN | 101000369 A | 7/2007 |
| CN | 101023632 A | 8/2007 |
| CN | 101082665 A | 12/2007 |
| CN | 101248626 A | 8/2008 |
| CN | 101455001 A | 6/2009 |
| EP | 1050977 A2 | 11/2000 |
| EP | 1180696 A2 | 2/2002 |

(56) References Cited

FOREIGN PATENT DOCUMENTS

| | | |
|---|---|---|
| EP | 1253404 A2 | 10/2002 |
| EP | 1253437 A2 | 10/2002 |
| EP | 1398913 A2 | 3/2004 |
| EP | 1480483 A2 | 11/2004 |
| EP | 1641183 | 3/2006 |
| EP | 1691170 | 8/2006 |
| EP | 1808708 A2 | 7/2007 |
| EP | 1862811 A2 | 12/2007 |
| EP | 1879370 A1 | 1/2008 |
| EP | 1992964 A2 | 11/2008 |
| EP | 2073562 A1 | 6/2009 |
| JP | 50052993 A | 5/1975 |
| JP | 59046568 A | 3/1984 |
| JP | 8146110 A | 6/1996 |
| JP | 8211141 A | 8/1996 |
| JP | 11313359 A | 11/1999 |
| JP | 11326484 A | 11/1999 |
| JP | 2000244967 A | 9/2000 |
| JP | 2001007764 A | 1/2001 |
| JP | 2001147262 A | 5/2001 |
| JP | 2001268622 A | 9/2001 |
| JP | 2001359146 A | 12/2001 |
| JP | 2002040121 A | 2/2002 |
| JP | 2002051000 A | 2/2002 |
| JP | 2002098747 A | 4/2002 |
| JP | 2002159041 A | 5/2002 |
| JP | 2003510614 A | 3/2003 |
| JP | 2003174665 A | 6/2003 |
| JP | 2003204572 A | 7/2003 |
| JP | 2003279648 A | 10/2003 |
| JP | 2004258009 A | 9/2004 |
| JP | 2004350088 A | 12/2004 |
| JP | 2005140617 A | 6/2005 |
| JP | 2005520139 A | 7/2005 |
| JP | 2005345200 A | 12/2005 |
| JP | 2006013894 A | 1/2006 |
| JP | 2006507500 A | 3/2006 |
| JP | 2006145223 | 6/2006 |
| JP | 2006148457 A | 6/2006 |
| JP | 2006170891 A | 6/2006 |
| JP | 2006311475 A | 11/2006 |
| JP | 2006325810 A | 12/2006 |
| JP | 2006352810 A | 12/2006 |
| JP | 2007500491 A | 1/2007 |
| JP | 2007089006 A | 4/2007 |
| JP | 2007127584 A | 5/2007 |
| JP | 2007512784 A | 5/2007 |
| JP | 2007212420 A | 8/2007 |
| JP | 2007248362 A | 9/2007 |
| JP | 2007526445 A | 9/2007 |
| JP | 2007529943 A | 10/2007 |
| JP | 2008026138 A | 2/2008 |
| JP | 2008029003 A | 2/2008 |
| JP | 2008039738 A | 2/2008 |
| JP | 2008503758 A | 2/2008 |
| JP | 2008054351 A | 3/2008 |
| JP | 2008507866 A | 3/2008 |
| JP | 2008104029 A | 5/2008 |
| JP | 2008122132 A | 5/2008 |
| JP | 2008128728 A | 6/2008 |
| JP | 2008522181 A | 6/2008 |
| JP | 2008527769 A | 7/2008 |
| JP | 2008533436 A | 8/2008 |
| JP | 2008224657 A | 9/2008 |
| JP | 2008233066 A | 10/2008 |
| JP | 2008236516 A | 10/2008 |
| JP | 2009074974 A | 4/2009 |
| JP | 2009150872 A | 7/2009 |
| JP | 2009253494 A | 10/2009 |
| JP | 2010019597 A | 1/2010 |
| JP | 2013167630 A | 8/2013 |
| JP | 2014503799 A | 2/2014 |
| JP | 2014504369 A | 2/2014 |
| JP | 2014139568 A | 7/2014 |
| KR | 20040068352 A | 7/2004 |
| TW | I240085 B | 9/2005 |
| TW | I250303 B | 3/2006 |
| TW | 200618539 | 6/2006 |
| TW | 200718972 | 5/2007 |
| TW | I292829 B | 1/2008 |
| TW | 200816840 A | 4/2008 |
| TW | I300852 B | 9/2008 |
| WO | 9913662 | 3/1999 |
| WO | 0120260 A1 | 3/2001 |
| WO | 0123904 A2 | 4/2001 |
| WO | WO-02063327 A2 | 8/2002 |
| WO | 03038466 | 5/2003 |
| WO | 2007021292 A2 | 2/2007 |
| WO | 2007056738 A2 | 5/2007 |
| WO | 2007121488 A1 | 10/2007 |
| WO | WO-2008012188 A1 | 1/2008 |
| WO | 2008057737 A2 | 5/2008 |
| WO | WO-2008051124 A1 | 5/2008 |
| WO | 2008066927 | 6/2008 |
| WO | WO-2008085440 A2 | 7/2008 |
| WO | 2008121878 A1 | 10/2008 |
| WO | 2008140880 A1 | 11/2008 |
| WO | 2010059934 | 5/2010 |
| WO | WO-2014137545 | 9/2014 |

OTHER PUBLICATIONS

"Efficient Solution and Performance analysis of 3-D Position Estimatin by Trilateration", Dimitris E. Manolakis, IEEE Transactions on Aerospace and Electronic Systems, vol. 32, No. 4, Oct. 1996.*
International Search Report & Written Opinion—PCT/US2009/065325, International Search Authority—European Patent Office—May 11, 2010.
Israel Martin-Escalona et al: "Impact of geometry on the accuracy of the passive-TDOA algorithm" Personal, Indoor and Mobile Radio Communications, 2008. PIMRC 2008. IEEE 19th International Symposium on, IEEE, Piscataway, No, USA, Sep. 15, 2008, pp. 1-6, XP031371602 ISBN: 978-1-4244-2643-0 abstract I I . Passive-TDOA Positioning Algorithm.
Xinrong Li et al: "Comparison of indoor geolocation methods in DSSS and OFDM wireless LAN systems" Vehicular Technology Conference, 2000. IEEE VTS Fall VTC 2000. 52nd Sep. 24-28, 2000, Piscataway, NJ, USA,IEEE, vol. 6, Sep. 24, 2000, pp. 3015-3020, XP010525129 ISBN: 978-0-7803-6507-0 abstract p. 3017, right-hand column.
Andre Gunther, et al., "Measuring Round Trip Times to Determine the Distance between WLAN Nodes", Proceedings of Networking 2005, May 6, 2005, pp. 1-12, XP002655207, Waterloo, Canada pp. 1-6.
Awad A., et al., "Adaptive Distance Estimation and Localization in WSN Using RSSI Measures" 10th Euromicro Conference on Gidital System Design Architectures, Methods and Tools (DSD 2007) Los Alamitos, CA IEEE Computer Soc., Piscataway, NJ, US Aug. 29, 2007 pp. 471-478.
Gerasenko S., et al., "Beacon Signals: What, Why, How, and Where", IEEE Computer Society, Computer, vol. 34, No. 10, pp. 108-110, Oct. 2001, doi:10.1109/2.955103.
Golden Stuart A. et al., "Sensor Measurements for Wi-Fi Location with Emphasis on Time-of-Arrival Ranging," IEEE Transactions on Mobile Computing, vol. 6 (10), 2007.
Jan Blumenthal, et al., "Precise Positioning with a Low Complexity Algorithm in Ad hoc Wireless Sensor Networks" Pik. Praxis der Informationsverarbeitung und Kommunikation, Saur, Muenchen, DE LNKD-DOI:10.1515/PIK0.2005.80, [Online] vol. 28, No. 2, Jun. 1, 2005, pp. 80-85, XP002495976.
Lim Y., et al., "Wireless Intrusion Detection and Response", IEEE, 8 Pages, 2003.
Mao, et al., "Wireless sensor network localization techniques" Computer Networks, Elsevier Science Publishers B.V;, Amsterdam, NL LNKD-DOI: 10.1016/J.Comnet. 2006.11.018, vol. 51, No. 10, May 6, 2007, pp. 2529-2553, XP022063022 ISSN: 1389-1286.
McCrady, et al. "Mobile Ranging with Low Accuracy Clocks", Radio and Wireless Conference 1999, pp. 85-88.

(56) References Cited

OTHER PUBLICATIONS

Murad Abusubaih, et al., "A dual distance measurement scheme for indoor IEEE 802.11 wireless local area networks" Mobile Wireless Communications Networks, 2007 9th IFIP International Conference on, IEEE, Piscataway, NJ, USA, Sep. 19, 2007, pp. 121-125, XP031359266 ISBN: 978-1-4244-1719-3.
Watkins L., et al., "A Passive Approach to Rogue Access Point Detections", IEEE, 6 pages, 2007.
Taiwan Search Report—TW098139790—TIPO—Jan. 12, 2013.

\* cited by examiner

NETWORK-CENTRIC DETERMINATION OF NODE PROCESSING DELAY

CLAIM OF PRIORITY UNDER 35 U.S.C. §119

The present Application for Patent claims priority to Provisional Application No. 61/117,020 entitled "Network-Centric Determination of Node Processing Delay" filed Nov. 21, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:
"BEACON SECTORING FOR POSITION DETERMINATION" by Aggarwal et al., U.S. patent application Ser. No. 12/622,369, filed on Nov. 19, 2009, assigned to the assignee hereof, and expressly incorporated by reference herein.
"WIRELESS POSITION DETERMINATION USING ADJUSTED ROUND TRIP TIME MEASUREMENTS" by Aggarwal et al., U.S. patent application Ser. No. 12/622,289, filed on Nov. 19, 2009, assigned to the assignee hereof, and expressly incorporated by reference herein.
"WIRELESS-BASED POSITIONING ADJUSTMENTS USING A MOTION SENSOR" by Aggarwal et al., U.S. patent application Ser. No. 12/622,307, filed on Nov. 19, 2009, assigned to the assignee hereof, and expressly incorporated by reference herein.
"METHOD AND APPARATUS FOR TWO-WAY RANGING" by Aggarwal et al., U.S. patent application Ser. No. 12/533,462, filed on Jul. 31, 2009, assigned to the assignee hereof, and expressly incorporated by reference herein.

FIELD OF DISCLOSURE

Aspects of this disclosure generally relate to wireless communication systems, and more specifically, to determining a position of a mobile station using network centric techniques.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

In conventional digital cellular networks, position location capability can be provided by Advanced Forward Link Trilateration (AFLT). AFLT may compute the position of a wireless device from the wireless device's measured time of arrival of radio signals transmitted from a plurality of base stations. Improvements to AFLT have been realized by utilizing hybrid position location techniques, where the mobile station may employ a Satellite Positioning System (SPS) receiver. The SPS receiver may provide position information independent of the information derived from the signals transmitted by the base stations. Moreover, position accuracy can be improved by combining measurements derived from both SPS and AFLT systems using conventional techniques. Additionally, with the increased proliferation of micro electro-mechanical systems (MEMS), small, on-board sensors may be used to provide additional relative position, velocity, acceleration and/or orientation information.

Position location techniques based upon signals provided by SPS and/or cellular base stations may encounter difficulties when the mobile device is operating within a building and/or within urban environments. In such situations, multipath and/or degraded signal strength can significantly reduce position accuracy, and can slow the "time-to-fix" to unacceptably long time periods. These shortcomings may be overcome by exploiting signals used in existing wireless data networks, such as Wi-Fi (e.g., Institute of Electrical and Electronics Engineers (IEEE) 802.11x standards), and having elements within the network infrastructure derive position information of the mobile device.

Having the network infrastructure accurately determine the position of a mobile device, utilizing signals from existing wireless data networks, may involve knowledge of precise time delays incurred by the wireless signals due to the latency of the mobile device and/or other network elements. Such delays may be spatially variant due to, for example, multipath and/or signal interference. Moreover, such delays may change over time based upon the type of network device and/or the network device's current networking load. Also, having the network determine position accurately using conventional techniques may involve precise time synchronization of elements within the network which may be difficult in practice to accomplish and maintain.

Thus, a need exists for a network centric position determination approach which can estimate processing delays and not require precise time synchronization of networking elements.

SUMMARY

Exemplary embodiments of the invention are directed to methods and apparatus for network-centric position determination of a mobile station. In one embodiment, a method of calibrating a delay within a wireless access point for determining a position of a mobile station is presented. The method may include receiving an initial packet, sent by the mobile station, at an eavesdropping device, and receiving a response packet, sent by the wireless access point, at the eavesdropping device. The method may further include computing a time difference based upon the initial packet and the response packet arrival times. The method may also include providing the time difference to a position determination entity.

In another embodiment, a method of refining calibrating a delay within a wireless access point for determining a position of a mobile station is presented. This embodiment may include providing a request to appropriate eavesdropping devices to send information and receiving, from each appropriate eavesdropping device, a time difference which represents a difference in a time of arrival of a packet transmitted by the wireless access point and a time of arrival of a packet transmitted by the mobile station. The method may further include determining a processing delay estimate based upon the time differences, and determining a position of the mobile station based upon the processing delay estimate and the received time differences.

In yet another embodiment, an apparatus for calibrating a delay within a wireless access point and determining a position of a mobile station is presented. The apparatus may include a wireless transceiver, a processor connected/coupled to the wireless transceiver, and a memory coupled to the processor. The memory stores executable instructions and data for causing the processor to receive an initial packet, sent by the mobile station, at an eavesdropping device, and receive a response packet, sent by the wireless access point, at the eavesdropping device. The instructions may further cause the processor to compute a time difference based upon the initial packet and the response packet arrival times, and provide the time difference to a position determination entity.

In yet another embodiment, an apparatus for calibrating a delay within a wireless access point and determining a position of a mobile station is presented. The apparatus may include a network interface, a processor coupled to the network interface, and a memory coupled to the processor. The memory stores executable instructions and data for causing the processor to provide a request to appropriate eavesdropping devices to send information, and receive, from each appropriate eavesdropping device, a time difference which represents a difference in a time of arrival of a packet transmitted by the wireless access point and a time of arrival of a packet transmitted by the mobile station. The instructions may further cause the processor to determine a processing delay estimate based upon the time differences, and determine a position of the mobile station based upon the processing delay estimate and the received time differences.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
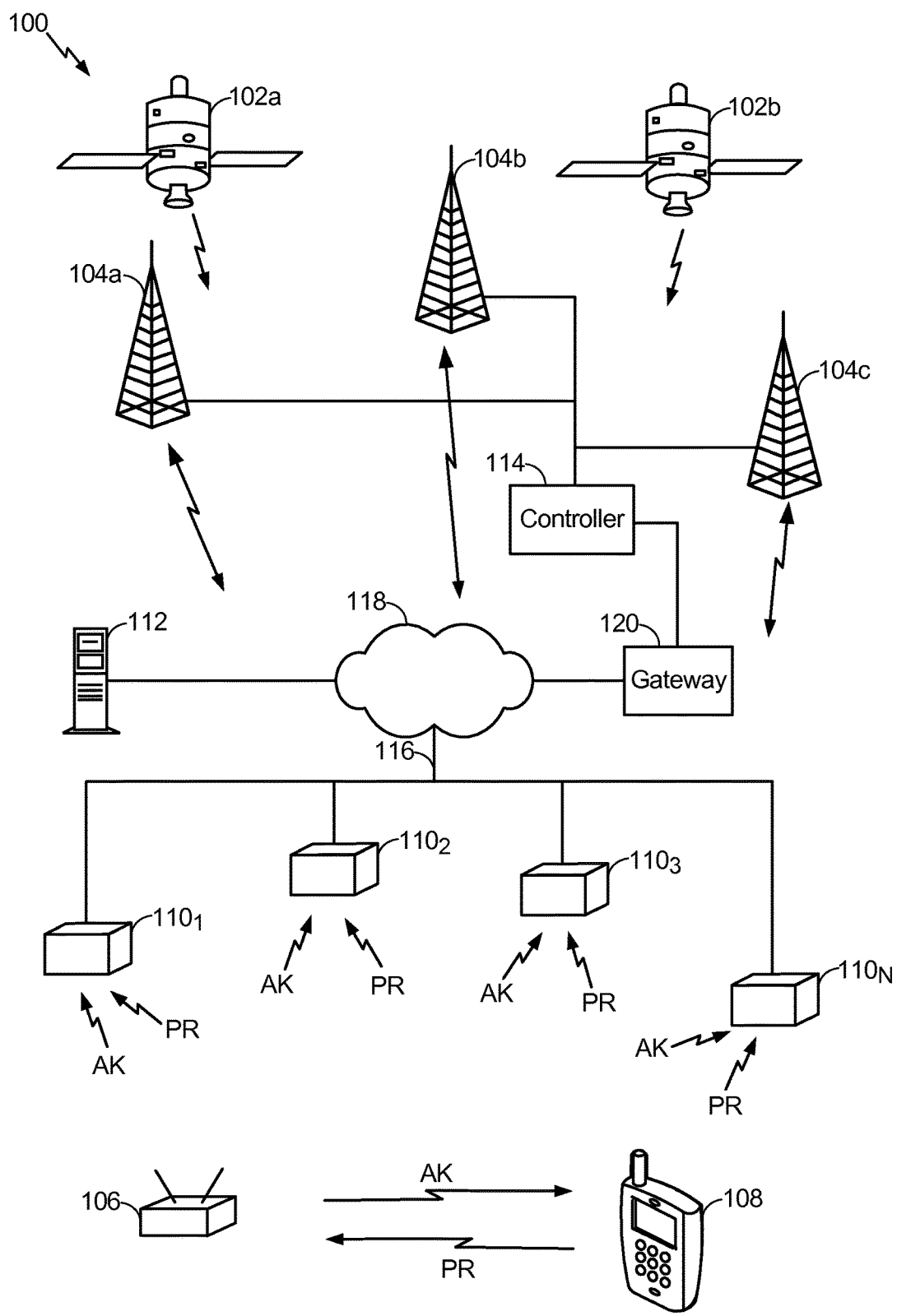
FIG. 1 illustrates a diagram of an exemplary operating environment for a mobile station according to one embodiment.

FIG. 1 is a diagram of an exemplary operating environment 100 for a mobile station 108 in communication with a network consistent with an embodiment of the disclosure. The operating environment 100 may contain one or more different types of wireless communication systems and/or wireless positioning systems. In the embodiment shown in FIG. 1, a Satellite Positioning System (SPS) may be used as an independent source of position information for the mobile station 108. The mobile station 108 may include one or more dedicated SPS receivers specifically designed to receive signals for deriving geo-location information from the SPS satellites.

The operating environment 100 may also include a backend network (also referred to herein as a back-haul network) which may be a wide area network. The backend network may include one or more wired and/or wireless networks, and can also provide internet and/or cellular data network access. The backend network may further include one or more Wide Area Network Wireless Access Points (WAN-WAPs) 104, which may be used for wireless voice and/or data communication, and potentially as another source of independent position information for mobile station 108. The WAN-WAPs 104 may be incorporated into a wireless wide area network (WWAN), which may include cellular base stations at known locations, and/or other wide area wireless systems, such as, for example, WiMAX (e.g., 802.16). The WWAN may further include one or more Controllers 114 (such as, for example, a Base Station Controller), and a Gateway 120 to interconnect the WWAN with a wide area network 118. Other known network components may further be included but are not shown in FIG. 1 for simplicity. Typically, each WAN-WAPs 104a-104c within the WWAN may operate from fixed, known positions, and provide network coverage over large metropolitan and/or regional areas.

The backend network may further include a separate Positioning Determination Entity (PDE) 112, which may be connected to the wide area network 118. The backend network may also include an interconnecting network 116 for interconnecting the local area network to the wide area network 118. Network 116 may be a wired network as shown in FIG. 1, however in other embodiments, it may be, either in whole or in part, a wireless network. Moreover, various embodiments may have the PDE functionality placed in another portion of the backend network.

The operating environment 100 may further include a wireless local area network (WLAN). The WLAN may include one or more Local Area Network Wireless Access Points (LAN-WAPs) 106 (where only one is shown in FIG. 1 for simplicity), and one or more Eavesdropping Devices (ED) 110. The WLAN may be used for wireless voice and/or data communication, as well as another independent source of position data. The LAN-WAP 106 may connect to the back end network in either a wireless or wired manner. When in range, the mobile station 108 may wirelessly exchange packets with the LAN-WAP 106. In various embodiments that will be described in subsequent sections of the disclosure, each ED $110_{1-N}$ may receive packets which are sent by the LAN-WAP 106 and the mobile station 108, without being associated with either device. This mode of reception by the EDs $110_{1-N}$ is referred to herein as "eavesdropping," and may be used as part of a network centric process to determine the position of the mobile station. The WLAN may typically operate in buildings and perform communications over smaller geographic regions than a WWAN, and it may operate under the protocols of a Wi-Fi network (IEEE 802.11x), Bluetooth Network, a femtocell, etc.

The mobile station 108 may derive other independent position information from any one or a combination of SPS transmitters 102, WAN-WAPs 104, and/or LAN-WAP 106. Each of the aforementioned systems can provide an independent estimate of the position for mobile station 108 using different techniques. In some embodiments, mobile station 108 may combine the solutions derived from each of the different types of access points to improve the accuracy of the position data. Access points may include conventional WLAN access points, femtocells, WiMax devices, Bluetooth devices, and so on. In the section below, details for conventionally determining the position of mobile station 108 are briefly presented.

Further referring to FIG. 1, the mobile station 108 may be representative of any type of portable wireless device. Thus, by way of example but not limitation, mobile station 108 may include a radio device, a cellular telephone device, a computing device, a personal communication system (PCS) device, a Personal Digital Assistant (PDA), a Personal Information Manager (PIM), a laptop, or other suitable mobile device which, for example, may be capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. "Mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile station."

As used herein, the term "wireless device" may refer to any type of wireless communication device which may transfer information over a network and may also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

When deriving position data using the SPS signals, the mobile station 108 may utilize a receiver specifically designed for use with the SPS signals that extracts position, using conventional techniques, from a plurality of signals transmitted by available SPS transmitters 102. The transmitters may be positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with, for example, GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites. When deriving position from the WWAN, each WAN-WAPs 104a-104c may take the form of base stations within a digital cellular network, and the mobile station 108 may include a cellular transceiver and processor that can exploit the base station signals to derive position. It should be understood that a digital cellular network may include additional base stations or other resources shown in FIG. 1. While WAN-WAPs 104 may actually be moveable or otherwise capable of being relocated, for illustration purposes it will be assumed that they are essentially arranged in a fixed position. The mobile station 108 may also perform position determination using conventional time-of-arrival techniques such as, for example, Advanced Forward Link Trilateration (AFLT). In other embodiments, each WAN-WAP 104a-104c may take the form of a WiMax wireless networking base station. In this case, the mobile station 108 may determine its position using time-of-arrival (TOA) techniques from signals provided by the WAN-WAPs 104. The mobile station 108 may determine positions either in a stand-alone mode, or using the assistance of an independent positioning server (not shown) and wide area network 118 using conventional TOA techniques. Note that embodiments of the disclosure may include having mobile station 108 determine position information using WAN-WAPs 104 which are different types. For example, some WAN-WAPs 104 may be cellular base stations, and other WAN-WAPs may be WiMax base stations. In such an operating environment, the mobile station 108 may be able to exploit the signals from each different type of WAN-WAP, and further combine the derived position solutions to improve accuracy.

When deriving independent position information of the mobile station based upon conventional techniques using the WLAN, the mobile station 108 may utilize time of arrival and/or signal strength techniques with the assistance of the positioning server (not shown) and the wide area network 118. The conventional position determination techniques may also be used in conjunction with other various wireless communication networks such as a wireless wide area network (WWAN), a wireless local area network (WLAN), a wireless personal area network (WPAN), and so on.

The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMax (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The above described localization techniques, as well as any other known conventional position determination approaches, may be used in conjunction with various network centric position determination embodiments to improve accuracy and/or performance. Network centric embodiments which may utilize conventionally determined localization information will be described in more detail in subsequent sections of the description.

Network Centric Position Determination of the Mobile Station

In accordance with some embodiments, the position of the mobile station 108 may be determined by collecting information associated with packet exchanges between the LAN-WAP 106 and the mobile station 108. This information may be collected and initially processed by one or more eavesdropping devices (EDs) $110_{1-N}$. Subsequently, this information may be sent to the position determination entity (PDE) 112, over networks 116 and 118, to determine the position of the mobile station 108.

Further referring to FIG. 1, in one embodiment, the mobile station 108 may send an initial wireless packet (e.g., shown as a unicast probe packet PR) to LAN-WAP 106. One should realize that embodiments described herein are not restrictive to using probe packets, but may use any unicast packet directed to the LAN-WAP 106. The initial wireless packet may be received by the LAN-WAP 106 over the WLAN, and after a delay corresponding to the LAN-WAP's processing time (hereinafter referred to as the "processing delay"), the LAN-WAP 106 may send a response packet back to the mobile station 108 (e.g., shown as an AK packet in FIG. 1). A plurality of EDs 110, each having locations which are known and/or determinable by the backend network, may receive the initial packet transmitted by the mobile station 108 and the response packet transmitted by the LAN-WAP 106. These packets are said to have been determined by "eavesdropping" because neither the LAN-WAP 106 nor the mobile station 108 are "aware" of their reception by the EDs 110. Each ED 110k may initially measure the time of arrival, signal strength, and/or other information of the initial packet and its associated response. Using time of arrival information, each ED 110k may also further determine a rough estimate of the LAN-WAP's processing delay. The measured timings, estimated processing delay, and/or other information may be coordinated and collected by the backend network for processing by the PDE 112. Using the collected information, and by knowing the positions of the LAN-WAP 106 and the EDs 110, the PDE 112 may accurately compute a set of distance differences. Each distance difference may be computed as the distance between the LAN-WAP 106 and the mobile station minus the distance between each ED 110k and the mobile station. From the set of distance differences, the PDE 112 can compute the position of the mobile station 108. More details of the position determination process is provided, for example, in the subsequent section describing FIG. 4A.

In other embodiments, the PDE's functionality may not take place in a separate entity as shown in FIG. 1, but somewhere else in the system 100. For example, in one embodiment, the other elements in the backend network, such as the Controller 114, may perform the coordination and position determining functions. In another embodiment, this functionality may be incorporated into any one of the EDs $110_{1-N}$, therefore, one or more software module(s) within an ED may then be considered as the position determination entity.

Because the collection of information and the subsequent processing may not take place in the LAN-WAP 106 and mobile station 108, no new functionality is required for these devices. Accordingly, various embodiments may have the advantage of using legacy LAN-WAPs and mobile stations because new functionality associated with position determination may be performed by the EDs 110 and/or the backend network. Moreover, because the backend network may rely upon time differences for computing the mobile station's position, arbitrary timing offsets may cancel out, thus clock synchronization among the EDs 110 may be avoided.

Figure 2:
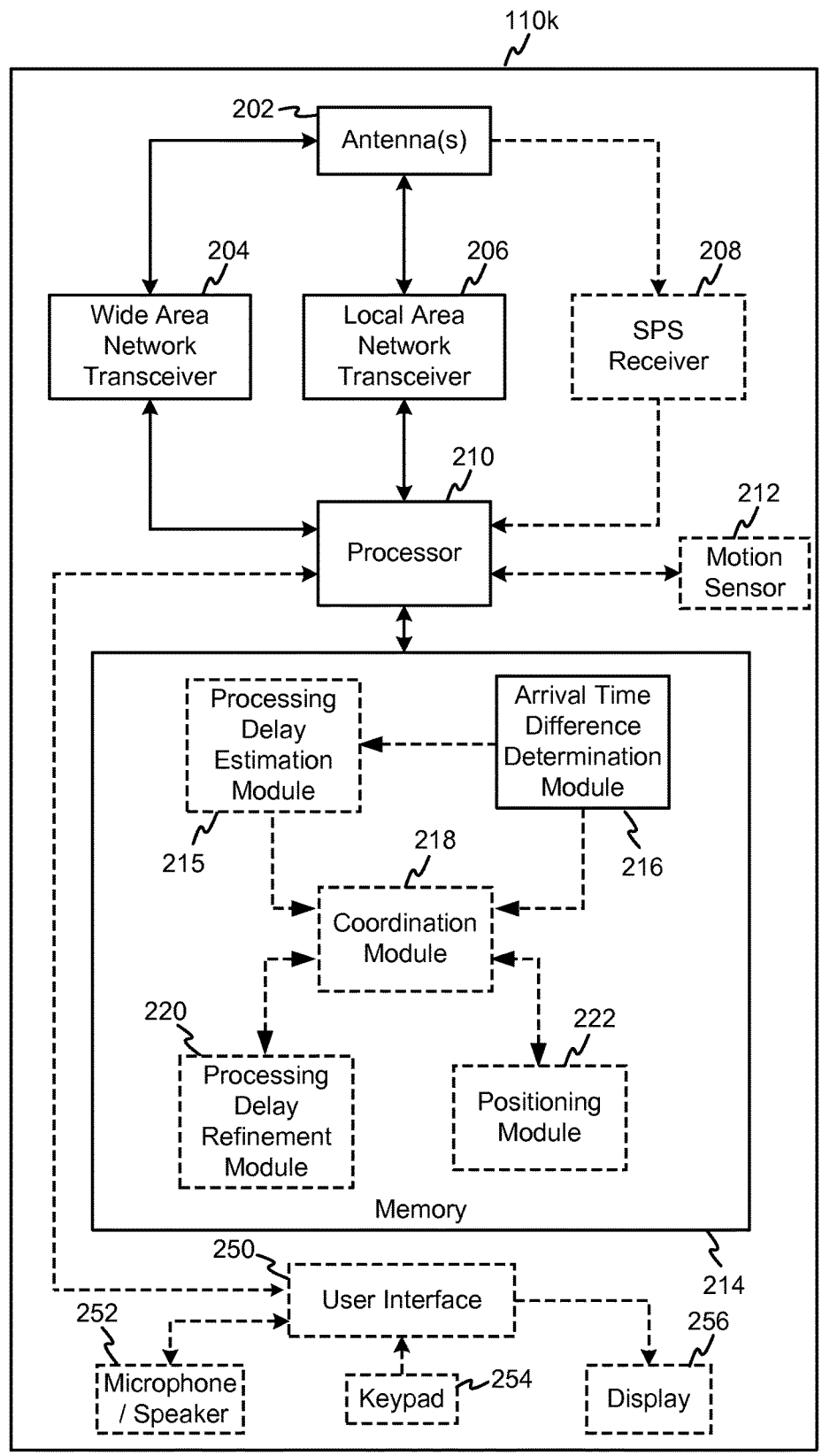
FIG. 2 shows a block diagram illustrating various components of an exemplary eavesdropping device (ED).

FIG. 2 is a block diagram illustrating various components of an exemplary Eavesdropping Device (ED) 110k. For the sake of simplicity, the various features and functions illustrated in the block diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The ED 110k may be any network device/entity that can eavesdrop on wireless network traffic between the LAN-WAP 106 and the mobile station 108, perform timing measurements and/or processing timing delay calculations, and can interface to the backend network. To this end, the ED may be, for example, a local area network wireless access point (LAN-WAP) having firmware, software, and/or hardware modifications for performing the timing measurements and/or processing delay calculations. In other embodiments the ED may be a special purpose network device, another mobile station operating in a peer-to-peer mode, a personal computer or server, a laptop, a smartbook, a netbook and/or handheld computer, a router, switch, and/or any combination thereof. As used herein, the ED 110k may be any stationary device, portable and/or movable device that may have the capability to eavesdrop on wireless signals within a WLAN and communicate information with the back end network.

The ED 110k may include one or more wide area network transceiver(s) 204 that may interface to one or more antennas 202 which may be configured to transmit and/or receive over suitable wireless frequency bands. The wide area network transceiver 204 may comprise suitable devices, hardware, firmware and/or software for communicating with and/or detecting signals to/from WAN-WAPs 104. The wide area network transceiver 204 may further communicate directly with other wired and/or wireless devices within the backend network. In one aspect, the wide area network transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wireless networking technologies may be used, for example, WiMax (IEEE 802.16), etc.

The ED 110k may also include one or more local area network transceivers 206, which may be wired and/or wireless, and may be connected/coupled to one or more antennas 202 and/or standard ports (e.g., Ethernet—not shown) for communications with the backend network (e.g., including wired network 116 and/or WAN 118). The local area network transceiver 206 may comprise suitable devices, hardware, and/or software for communicating with and/or detecting signals to/from the LAN-WAP 106, mobile station 108, other EDs, and/or directly with other wireless devices within a network. Typically, it is this wireless transceiver which may be used to eavesdrop on packet exchanges between the mobile station 108 and the LAN-WAP 106. In one aspect, the local area network transceiver 206 may comprise a Wi-Fi (IEEE 802.11x) communication system suitable for communicating with one or more wireless access points; however in other aspects, the local area network transceiver 206 may comprise another type of wireless local area network, wireless personal area network (e.g., Bluetooth), etc. Additionally, any other type of local wireless networking technologies may be used, for example, Ultra Wide Band, ZigBee, wireless USB, etc.

In various embodiments, an ED 110k may be stationary, and the position of the ED 110k may be known to the backend network in advance. For example, the PDE 112 may store the positions of each ED 110k after receiving them over network 118. In other optional embodiments, one or more EDs 110 may not be stationary, and thus may be tracked in any conventional manner in order to determine their positions. Accordingly, when the ED is non-stationary, it may include its position in addition to the information it normally provides to the PDE 112. As shown in FIG. 2, an optional Satellite Positioning System (SPS) receiver 208 (shown in dotted lines) may be included in the ED 110k to track its movement. The SPS receiver 208 may be connected/coupled to the one or more antennas 202 for receiving satellite signals, and may comprise any suitable hardware and/or software for receiving and processing SPS signals.

In other embodiments, an optional motion sensor 212 (shown in dotted lines) may be coupled to processor 210 to provide relative movement and/or orientation information which is independent of motion data derived from signals received by the wide area network transceiver 204, the local area network transceiver 206 and the SPS receiver 208. By way of example but not limitation, motion sensor 212 may utilize an accelerometer (e.g., a MEMS device), a gyroscope, a geomagnetic sensor (e.g., a compass), an altimeter (e.g., a barometric pressure altimeter), and/or any other type of motion detection sensor. Moreover, motion sensor 212 may include a plurality of different types of devices and combine their outputs in order to provide motion information.

A processor 210 may be connected/coupled to the wide area network transceiver 204, local area network transceiver 206, and optionally, the SPS receiver 208 and/or the motion sensor 212. The processor 210 may include, for example, one or more microprocessors, microcontrollers, controllers, ASICs, and/or digital signal processors that provide processing functions, as well as other calculation and control functionality. The processor 210 may also include memory 214 for storing data and software instructions for executing programmed functionality within the ED. The memory 214 may be on-board the processor 210 (e.g., within the same IC package), and/or the memory may be external memory to the processor and functionally coupled over a data bus.

A number of software modules and/or data tables may reside in memory 214 and be utilized by the processor 210 for managing both communications and/or positioning determination functionality. As illustrated here, within memory 214, the ED 110k may further include or otherwise provide an arrival time difference determination module 216. The arrival time difference determination module 216 may determine the arrival times of eavesdropped packets originating from mobile station and the LAN-WAP, and then determine their difference. This may be accomplished using a running timer and recording the times of arrival of probe and response packets, then buffering their difference prior to sending this information over the back end network to the PDE 112.

In another embodiment, wherein the ED 110k may further perform the functionality of a position determination entity, the memory may further include the following optional modules (as shown in dotted lines): a processing delay estimation module 215, a coordination module 218, a processing delay refinement module 220, and a positioning module 222. The coordination module may interrogate one or more suitable EDs 1101-N and instruct them to provide information (e.g., initial unicast packet and acknowledgment packet arrival times, time difference of arrival between these packets, optional position data of the ED, etc.). This information may be provided to the processing delay estimation module 215 which may compute an initial estimate of the time delay introduced by amount of processing time the LAN-WAP 106 takes to process an incoming unicast packet and provide a suitable response, such as an acknowledgement packet. The estimate may be refined by the processing delay refinement module 220 to refine the processing delay estimate associated with LAN-WAP 106. Once the processing delay estimate is determined, it may be used in the positioning module 222 for determining an estimated position of the mobile station using known techniques (e.g., multilateration.) In this embodiment, any combination of the optional modules may be considered as a software implementation of a position determination entity embodied in the ED 110k.

While the modules shown in FIG. 2 are illustrated in the example as being contained in memory 214, it is recognized that in certain implementations such procedures may be provided for or otherwise operatively arranged using other or additional mechanisms. For example, all or part of processing delay estimation module 215, processing delay refinement module 220, positioning module 222, coordination module 218, and/or arrival time difference determination module 216 may be provided in firmware. Additionally, while in this example processing delay estimation module 215 and processing delay refinement module 220 are illustrated as being separate features, it is recognized, for example, that such procedures may be combined together as one procedure or perhaps with other procedures, or otherwise further divided into a plurality of procedures.

In some embodiments, for example when the ED 110k is a laptop or even a second mobile station (in the event peer-to-peer networking is being used), the ED 110k may optionally include a user interface 250, which may provide any suitable interface systems, such as a microphone/speaker 252, keypad 254, and/or display 256 (all shown in dashed lines) that allows user interaction. The microphone/speaker 252 may provide for voice communication services using the wide area network transceiver 204 and/or the local area network transceiver 206. The keypad 254 may comprise any suitable buttons for user input. The display 256 may comprise any suitable display, such as, for example, a backlit LCD display, and may further include a touch screen display for additional user input modes.

Figure 3:
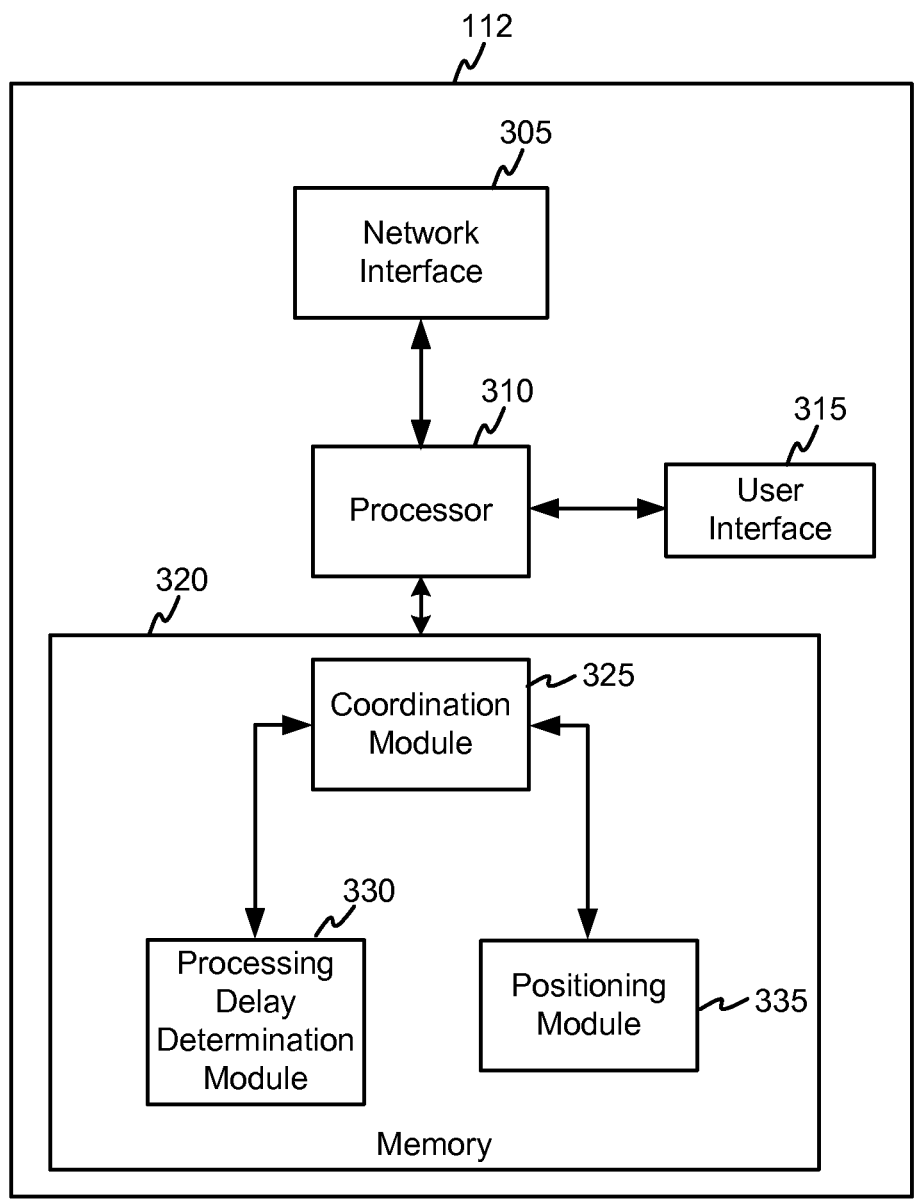
FIG. 3 shows is a block diagram illustrating various components of an exemplary Position Determination Entity (PDE).

FIG. 3 is a block diagram illustrating one exemplary embodiment of a Position Determination Entity (PDE) 112. The position determination entity may be a separate device which resides within the back end network. It may coordinate the reception of information provided by appropriate EDs (determined using the eavesdropped packets from the LAN-WAP 106 and mobile station 108), and further combine and process the received information to determine the position of the mobile station 108. Once the position of the mobile station 108 is determined, it may be provided to the mobile station 108 and/or to any one of the EDs 110 via the back end network. When residing on the back end network, the ED may typically be a stationary server which is exemplified in FIG. 3. However, as explained above in the description of FIG. 2, in some embodiments, the functionality of the PDE 112 may be optionally incorporated into one (or more) of the EDs 110.

For the sake of simplicity, the various features and functions illustrated in the block diagram of FIG. 3 are connected together using a common bus which is meant to represent that these various features and functions are operatively coupled together. Those skilled in the art will recognize that other connections, mechanisms, features, functions, or the like, may be provided and adapted as necessary to operatively couple and configure an actual device. Further, it is also recognized that one or more of the features or functions illustrated in the example of FIG. 3 may be further subdivided or two or more of the features or functions illustrated in FIG. 3 may be combined.

The PDE 112 may include a network interface 305 that may be wired and/or wireless for communicating over a WAN and/or LAN. In one embodiment, the PDE 112 may communicate with other network elements in the back end network via WAN 118, which may include communications with WWAN via the gateway 120. The PDE may also communicate using network interface 305 over the WAN 118 and/or interconnecting network 116 to exchange information with one or more EDs 110. The network interface 305 may utilize any known wired networking technology (e.g., Ethernet) and/or wireless technology (e.g., Wi-Fi (IEEE 802.11x)).

A processor 310 may be connected/coupled to the network interface 305, a user interface 315 and memory 320. The processor 310 may include one or more microprocessors, microcontrollers, and/or digital signal processors that provide processing functions, as well as other calculation and control functionality. The processor 310 may access memory 320 for reading/writing data and/or software instructions for executing programmed functionality. The memory 320 may be on-board the processor 310 (e.g., within the same IC package), and/or the memory may be external memory to the processor and functionally coupled over a data bus.

A number of software modules and/or data tables may reside in memory 320 and be utilized by the processor 310 for managing both ED coordination and/or positioning determination functionality. As illustrated here, within memory 320, the PDE 112 may further include or otherwise provide a coordination module 325, a processing delay determination module 330, and a positioning module 335. The coordination module 325 may interrogate one or more suitable EDs 110 and instruct them to provide information to facilitate the position determination of the mobile station 108. When requested by the PDE 112, each ED 110$k$ may provide, for example, probe and acknowledgment packet arrival times from the mobile station 108 and the LAN-WAP 106, respectively, processing delay estimates computed by each ED 110$k$ associated with the LAN-WAP 106, optional position data of the ED 110$k$, etc. Once this information is received by the PDE 112, the coordination module 325 may perform further processing and then pass the information on to the processing delay determination module 330. The processing delay determination module may utilize and combine the received information to determine a refined processing delay estimate associated with LAN-WAP 106. Once the refined processing delay estimate is determined, it may be used in the positioning module 335, along with time of arrival distances of the probe and acknowledgment packets received at each ED 110$k$, the positions of each ED 110$k$, and position of the LAN-WAP 106, to compute an estimate of the mobile station 108 using known techniques such as multilateration.

While the software modules shown in FIG. 3 are illustrated in the example as being contained in memory 320, it should be recognized that in certain implementations such procedures may be provided for or otherwise operatively arranged using other or additional mechanisms. For example, all or part of coordination module 325, processing delay determination module 330, and/or positioning module 335 may be provided in firmware. Additionally, while in FIG. 3 the modules are shown as distinct entities, it should be understood that, for example, the illustrated modules may be combined together as one procedure, or perhaps with other modules not illustrated, or otherwise be further partitioned into a differing groups of procedures.

Figure 4A:
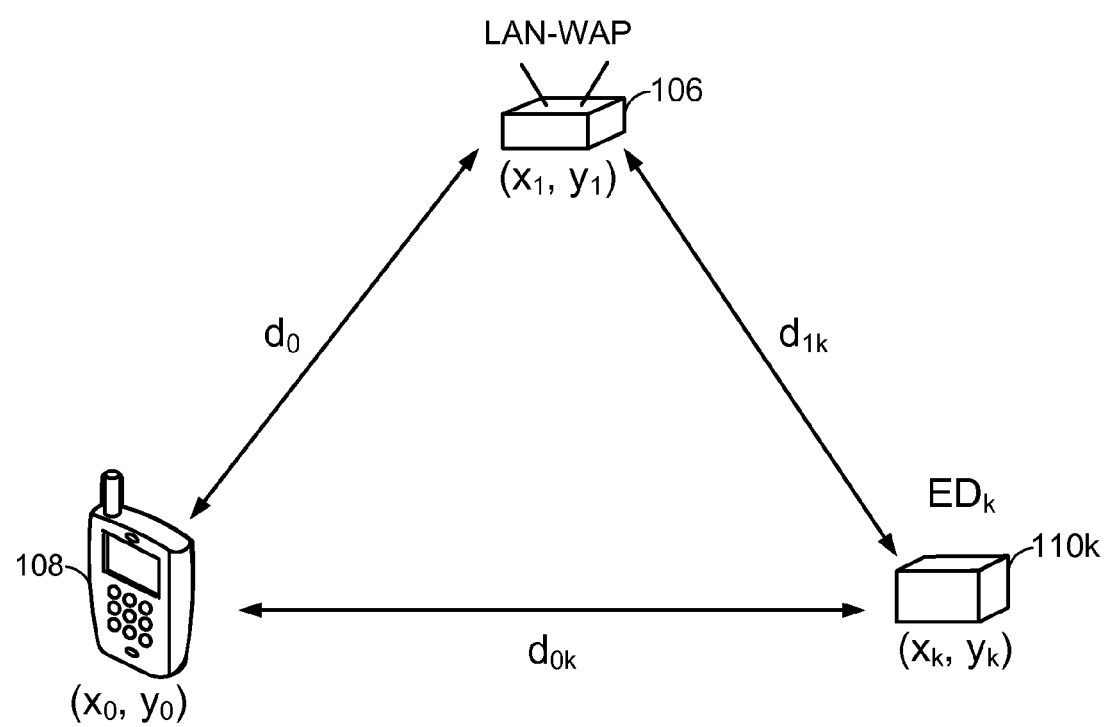
FIGS. 4A-4D illustrate diagrams of simplified network geometries to describe the timing information that is collected and/or processed by an ED for network centric position determination.

FIG. 4A shows a diagram of a simplified network geometry to illustrate how information collected by an ED 110$k$ may be used to assist in the position determination of a mobile station 108. The ED 110$k$ (where k=1, 2, . . . , N) may be any one of the eavesdropping devices ED 110$_{1-N}$ as shown in FIG. 1. While the exemplary geometry depicted in FIG. 4A is shown in two dimensions, one would appreciate that the embodiments described herein may be extended to operate in three dimensions. Also, while only one LAN-WAP 106 is illustrated, the mobile station 108 may communicate with a plurality of LAN-WAPs. Finally, while only one ED 110$k$ is shown in FIG. 4A, there may typically be a plurality of EDs spread over an area of interest that are within wireless range of the mobile station 108 and the LAN-WAPs, in order to obtain eavesdropped packets collected from a number of different geometries.

During operation, the mobile station 108 may initiate a packet transmission (which may be a unicast probe packet (PR)) to the LAN-WAP 106. The LAN-WAP may then receive and process the packet. After a processing delay $\Delta$ corresponding to the processing time, the LAN-WAP 106 may in response transmit a response packet (AK) back to the mobile station 108. Accurate knowledge of the processing delay $\Delta$ may typically not be known a priori. In some instances, the processing delay $\Delta$ may be constant for every packet exchange. In other implementations, the processing delay may vary for every packet exchange. Furthermore, the processing delay $\Delta$ may have a wide range of uncertainty. As will be shown in detail below, the processing delay $\Delta$ may be used in conjunction with other information to accurately determine the position of the mobile station 108. Accordingly, embodiments included herein describe to a set of techniques for the network to accurately estimate the processing delay $\Delta$.

As shown in FIG. 4A, the mobile station 108 may be positioned at location ($x_0$, $y_0$) and exchange packets with the LAN-WAP 106, which may be located at ($x_1$, $y_1$). The ED 110$k$, which may be located at ($x_k$, $y_k$), can eavesdrop on packets sent by both the LAN-WAP 106 and the mobile station 108. Given this relative geometry, the distance between mobile station 108 and the LAN-WAP 106 may be expressed as $d_0$; the distance between the mobile station 108 and the ED 110$k$ may be expressed as $d_{0k}$; and the distance between the LAN-WAP 106 and the ED 110$k$ may be expressed as $d_{1k}$. In order to simplify the mathematical notation presented below, these distances may be expressed in feet and times associated therewith expressed in nanoseconds (ns), so the velocity of the propagation of the electromagnetic signals encoding the packets may be approximated 1 ft/ns in free space.

Accordingly, $T_{k,0}$ is the time (ns) at which the packet sent from the mobile station 108 arrives at ED 110$k$, $T_{k,1}$ is the time (ns) at which the packet from LAN-WAP 106 arrives at ED 110$k$, T (ns) is an arbitrary clock timing offset at ED 110$k$, and $\Delta$ (ns) is the unknown processing delay introduced by the LAN-WAP 106.

At ED 110$k$, the time $T_{k,0}$ at which the packet from mobile station 108 arrives at ED 110$k$ may be expressed as:

$$T_{k,0} = T + d_{0k} \quad (1)$$

Further, at ED 110$k$, the time $T_{k,1}$ at which the packet from LAN-WAP 106 arrives at ED 110$k$ may be expressed as:

$$T_{k,1} = T + d_0 + \Delta + d_{1k} \quad (2)$$

The ED 110$k$ may calculate a time difference as follows:

$$T_k = T_{k,1} - T_{k,0} \quad (3)$$

This value $T_k$, which is the difference in a time of arrival of a packet transmitted by the wireless access point and a time of arrival of a packet transmitted by the mobile station, can be provided to the backend network (e.g., the PDE 112) to be used in position determination of the mobile station 108. In order to determine distance using this time difference, a known technique called multilateration may be used for position determination. Multilateration, which may also be known as hyperbolic positioning, is the process of locating an object by accurately computing a distance difference from a signal provided by that object to two or more receivers.

The distance difference needed for multilateration may be given by:

$$d_0 - d_{0k} = T_k - d_{1k} - \Delta \quad (4)$$

The network may know the distance $d_{1k}$, for example if the LAN-WAP 106 and the ED 110$k$ are in stationary, known positions (or are tracked using conventional techniques, such as, for example SPS positioning). Thus, the network may calculate the distance difference $d_0 - d_{0k}$ once the processing delay $\Delta$ is estimated.

From equation (4), the processing delay $\Delta$ may be expressed as:

$$\Delta = T_k - (d_0 + d_{1k} - d_{0k}) \quad (5)$$

A first estimate of the processing delay (which optionally may be computed by the ED 110$k$) may be obtained by limiting the bounds on $\Delta$ based upon the triangle inequality, and can be expressed by the following formulas:

$$0 \leq d_0 + d_{1k} - d_{0k} \leq 2d_{1k} \quad (6)$$

$$T_k - 2d_{1k} \leq \Delta \leq T_k \quad (7)$$

Because there typically may be a plurality of EDs $110_{1-N}$ employed in the network geometry 100 as shown in FIG. 1, the processing delay $\Delta$ may be refined by coordinating and combining the information received and/or calculated by the appropriate EDs (e.g., ones having reasonable signal strength from both the mobile station 108 and the LAN-WAP 106). The coordination and/or combining operations may take place at the back end network (e.g., at the PDE 112) for determining a refined estimate of $\Delta$, and subsequently an accurate position of the mobile station 108.

For example, given multiple ED $110k$, k=1, 2, 3, ..., N, equation (7) can be expressed in terms of an upper and a lower limit as follows:

$$\max_{k=1,2,...} \{T_k - 2d_{1k}\} \leq \Delta \leq \min_{k=1,2,...} \{T_k\} \quad (8)$$

However, the processing delay $\Delta$ found from equation (8) may be bounded by a wide range of uncertainty. Therefore, other techniques to calculate the processing delay $\Delta$ may be utilized at the back end network, either alone or in combination, for improving the estimate of the processing delay $\Delta$. Determination of a position of mobile station 108 may comprise adjusting each time difference using the processing delay, determining distance differences by subtracting a distance between the wireless access point and each eavesdropping device from the adjusted time differences, and performing multilateration using the distance differences to estimate the position of mobile station 108.

Below a number of different techniques are described, which may be employed at the back end network, to further refine the processing delay $\Delta$ and better estimate the position of the mobile station 108. These techniques may include refining the processing delay based upon: determination of the relative geometry of mobile station 108, LAN-WAP 106 and the ED $110k$; the signal strength received at the ED $110k$; trilateration using distances to the mobile station 108; and refining based upon a previous position of the mobile station 108.

Refining Processing Delay Based Upon Geometry

Figure 4B:
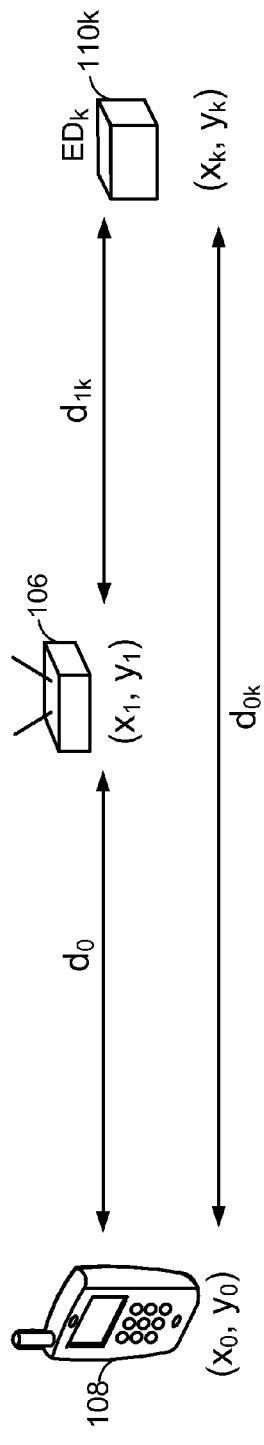
Figure 4C:
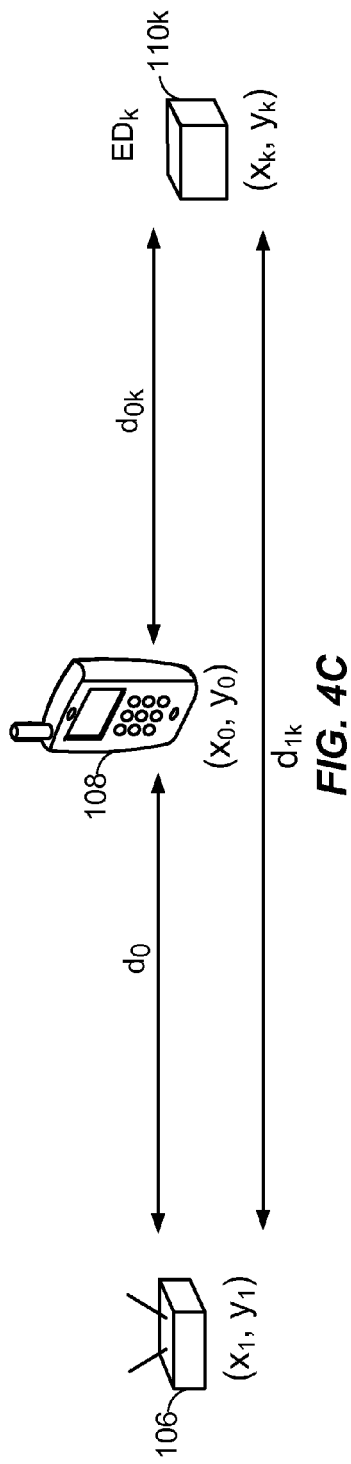
Figure 4D:
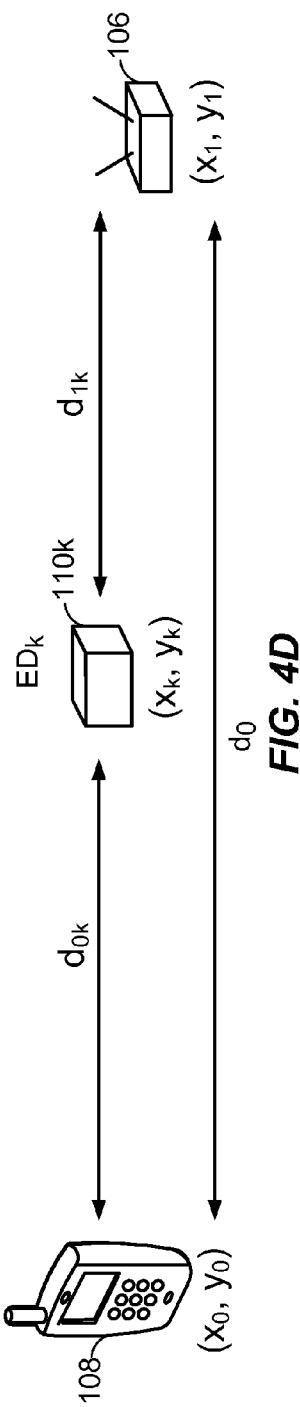

Depending upon the determination of relative position of the mobile station 108, each ED $110k$, and the LAN-WAP 106, certain assumptions may be made to improve the estimate of the processing delay $\Delta$. FIGS. 4B, 4C and 4D illustrate several different relative geometries where different assumptions may be made to refine $\Delta$.

In one example, as shown in FIG. 4B, the mobile station 108, LAN-WAP 106 and ED $110k$ are nearly collinear with the LAN-WAP 106 in between mobile station 108 and ED $110k$. This scenario exemplified by FIG. 4B may occur in areas with densely populated EDs $110_{1-N}$ and/or LAN-WAPs.

Therefore, from equation (5), the processing delay may be calculated by the following expression:

$$\Delta = T_k - (d_0 + d_{1k} - d_{0k}) \approx T_k \quad (9)$$

Accordingly, as can be seen from FIG. 4B, because $d_{0k}$ is approximately equal to $d_0 + d_{1k}$, the distance quantities in equation (9) may tend to cancel out. Therefore it is likely that the processing delay $\Delta$ is in the higher end of the range expressed in equation (8), particularly for dense deployments.

In another example, as shown in FIG. 4C, the mobile station 108, LAN-WAP 106 and ED $110k$ are nearly collinear with the mobile station 108 in between LAN-WAP 106 and ED $110k$. As above, the scenario exemplified by FIG. 4C may occur in areas with densely populated ED $110_{1-N}$ and/or LAN-WAPs.

If the ED $110k$ also serves as another LAN-WAP in the network geometry, an assumption can be made that the mobile station 108 may be closer to LAN-WAP 106, otherwise it would associate with ED/LAN-WAP $110k$. Accordingly, given these assumptions, the following equations may follow:

Therefore, from equation (5), the processing delay may be calculated by the following expression:

$$\Delta = T_k - (d_0 + d_{1k} - d_{0k}) \approx T_k - d_{1k} \quad (11)$$

In this situation, it is likely that the processing delay $\Delta$ is in the upper part of the range as shown in equation (8).

In yet another example shown in FIG. 4D, the lower end of the permissible range shown in equation (8) may occur when the mobile station 108, the LAN-WAP 106, and the ED $110k$ are nearly collinear, with the ED $110k$ substantially in the middle. Accordingly, as can be seen from FIG. 4C, in this situation, $d_0$ is approximately equal to $d_{0k} + d_{1k}$. Taking this into account and modifying equation (5) accordingly, the processing delay $\Delta$ can be expressed as follows:

$$\Delta = T_k - (d_0 + d_{1k} - d_{0k}) \approx T_k - 2d_{1k} \quad (12)$$

However, if ED $110k$ also functions as a LAN-WAP, this situation may be unlikely because the mobile station 108 would probably not associate with LAN-WAP 106 as the ED/LAN-WAP $110k$ is closer. Accordingly, for embodiments where the ED also functions as a LAN-WAP, it is likely that the processing delay $\Delta$ is in the higher end of the range expressed in equation (8), particularly for dense deployments.

Refining Processing Delay Based Upon Signal Strength

In some embodiments, the distances between the ED $110k$ and each signal source may be refined based upon a model which relates distance to received signal strength (e.g., RSSI). Such models are described in the incorporated related patent application "WIRELESS POSITION DETERMINATION USING ADJUSTED ROUND TRIP TIME MEASUREMENTS" having Ser. No. 12/622,289.

For example, the range between the mobile station 108 and the ED $110k$ may be bounded by the following equation which may be estimated within the back end network.

$$R_{k,min} \leq d_{0k} \leq R_{k,max} \quad (13)$$

The back end network may also assume that the mobile station 108 is within radio range of the LAN-WAP 106, thus the following range can be assumed.

$$R_{min} \leq d_0 \leq R_{max} \quad (14)$$

It should be understood that the ED $110k$ can not estimate the RSSI seen at LAN-WAP 106 or mobile station 108. Accordingly, this range estimate may be based upon the data rate used for packets between the mobile station 108 and the LAN-WAP 106. A higher data rate may generally indicate that the mobile station 108 is closer to LAN-WAP 106.

Finally, if the ED $110k$ also performs LAN-WAP functionality, the back end network may assume that the mobile station is probably closer to LAN-WAP 106 than ED/LAN-WAP $110k$, within some factor based upon knowledge of how the mobile stations hand off between LAN-WAPs. Mathematically, this may be represented as the following equation.

$$d_0 \leq d_{0k} + f_H(d_{1k}) \quad (15)$$

In equation (15), the function $f_H(\cdot)$ is a function relating hand-off behavior and distance which may be based upon conventional models.

Refining Processing Delay Based Upon Trilateration

As mentioned above, there exist models which relate signal strength measurements (e.g., RSSI) and distance. Such models may be used by the back end network to estimate the bounds on the distance between the mobile station 108 and each ED 110$k$. Mathematically, these bounds may be represented by the following equation.

$$R_{k,min} \leq d_{0,k} \leq R_{k,max} \tag{16}$$

Once these bounds are determined using the signal strength models, each distance may be estimated as the midpoint of the range in equation (16) for each appropriate ED 110$k$. Given these ranges, the back end network may use conventional trilateration techniques to estimate the position of the mobile station 108 using the approximate distances. Once the position of the mobile station is determined, a set of approximate distances $\hat{d}_{0k}$ for k=1, N may be computed, along with the approximate distance to the LAN-WAP, $\hat{d}_0$. This estimated distance may be further iterated upon using subsequent trilateration operations to improve the distance estimates. These techniques are discussed in incorporated related patent application "WIRELESS POSITION DETERMINATION USING ADJUSTED ROUND TRIP TIME MEASUREMENTS" having Ser. No. 12/622,289.

Once the distance estimates are determined, the estimated position of the mobile station 108 may then be used to refine the processing delay using the following equation $$\Delta = \text{mean}(T_k - (\hat{d}_0 + d_{1k} - \hat{d}_{0k})) \tag{17}$$

The backend network may then determine a more accurate position of the mobile station 108 using the multilateration algorithm along with the refined processing delay $\Delta$ as computed in equation (17).

Refining Processing Delay Based Upon Previous Position

Another technique for refining the processing delay $\Delta$ is by having the back end network utilize the previous position of the mobile station 108 in order to determine the current position of the mobile station 108. In this exemplary embodiment, the PDE 112 may have previously calculated the position of the mobile station 108. Further, the previous position of the mobile station 108 may be a good estimate depending upon its speed and how much time has elapsed since the previous position was determined, for example, a few seconds at pedestrian speeds. In such situations, it is likely that the mobile station 108 has not moved a significant distance, thus making the previous position of the mobile station useful for refining the processing delay $\Delta$. For example, a first distance estimate between mobile station 108 and a LAN-WAP can be calculated based upon a previous position of mobile station 108, and a second distance estimate between mobile station 108 and a ED can be calculated based upon the previous position of mobile station 108.

In more detail, the previous position of the mobile station 108 can be utilized to estimate the processing delay $\Delta_k$ for each LAN-WAP by the following expression:

$$\Delta_k \approx T_k - (d_{0,old} + d_{1k} - d_{0k,old}) \tag{18}$$

Afterwards, the values of the processing delay $\Delta_k$ by each of the ED 110$k$ can be averaged to obtain a new estimate for the processing delay $\Delta_{avg}$ as expressed by:

$$\Delta_{avg} = \{\Delta_1 + \Delta_2 + \ldots \Delta_N\}/N \tag{19}$$

Further, the new estimate for the processing delay $\Delta_{avg}$ as expressed by equation (19) may satisfy the bounds expressed by the triangle inequality. For example, the triangle inequality shown in equation (8) implies that for k=1, 2, 3 ..., N, the refined processing delay $\Delta_{avg}$ will likely be in the range: max $\{T_k - 2d_{1k}\} \leq \Delta_{avg} \leq \min\{T_k\}$.

Afterwards, the position of mobile station 108 can be calculated via conventional multilateration techniques using the processing delay $\Delta_{avg}$.

Figure 5:
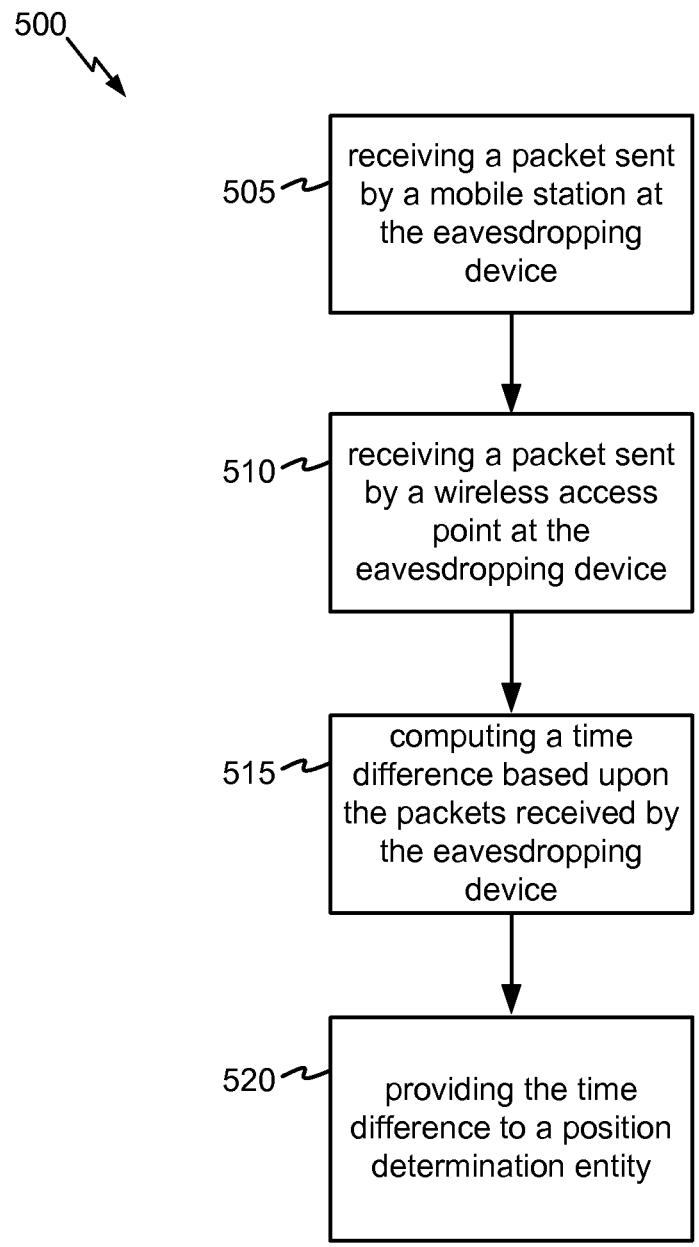
FIG. 5 shows a flowchart illustrating an exemplary method for eavesdropping and determining information at the ED for network centric positioning.

FIG. 5 shows an exemplary flowchart 500 illustrating a method which may be performed at the ED 110$k$. The method may start by receiving an initial packet that was sent by the mobile station 108 (505). The initial packet may be a unicast probe packet (PR) directed at the LAN-WAP 106, but other types of packets may be used. The ED 110$k$ may then receive a packet sent by the LAN-WAP 106 which was sent in response (AK) to the initial PR packet (510). The packets received by the ED 110$k$ are typically not intended for this device, and the mobile station and/or the LAN-WAP 106 is not "aware" the packets are being eavesdropped by ED 110$k$. Moreover, each packet from the LAN-WAP 106 and or mobile station 108 may be identified by associating it with any form of identifying information included in the packet (such as, for example, a MAC address). Also, the ED 110$k$ may record the signal strength of each packet it receives and further associate the strength with the packet's identifying information.

The ED 110$k$ may then compute a time difference using the arrival times of the PR and AK packets (515). In another embodiment, the ED 110$k$ may optionally use the computed time difference and knowledge of the distance between the LAN-WAP 106 and the ED 110$k$ ($d_{1k}$), to compute an initial estimate of the processing delay $\Delta$ using equation (5) (not shown). The ED 110$k$ may then provide the computed time difference to a position determination entity (520). In addition, the ED 110$k$ may also provide the signal strength associated with the packets received from the mobile station and/or the LAN-WAP 106.

Figure 6:
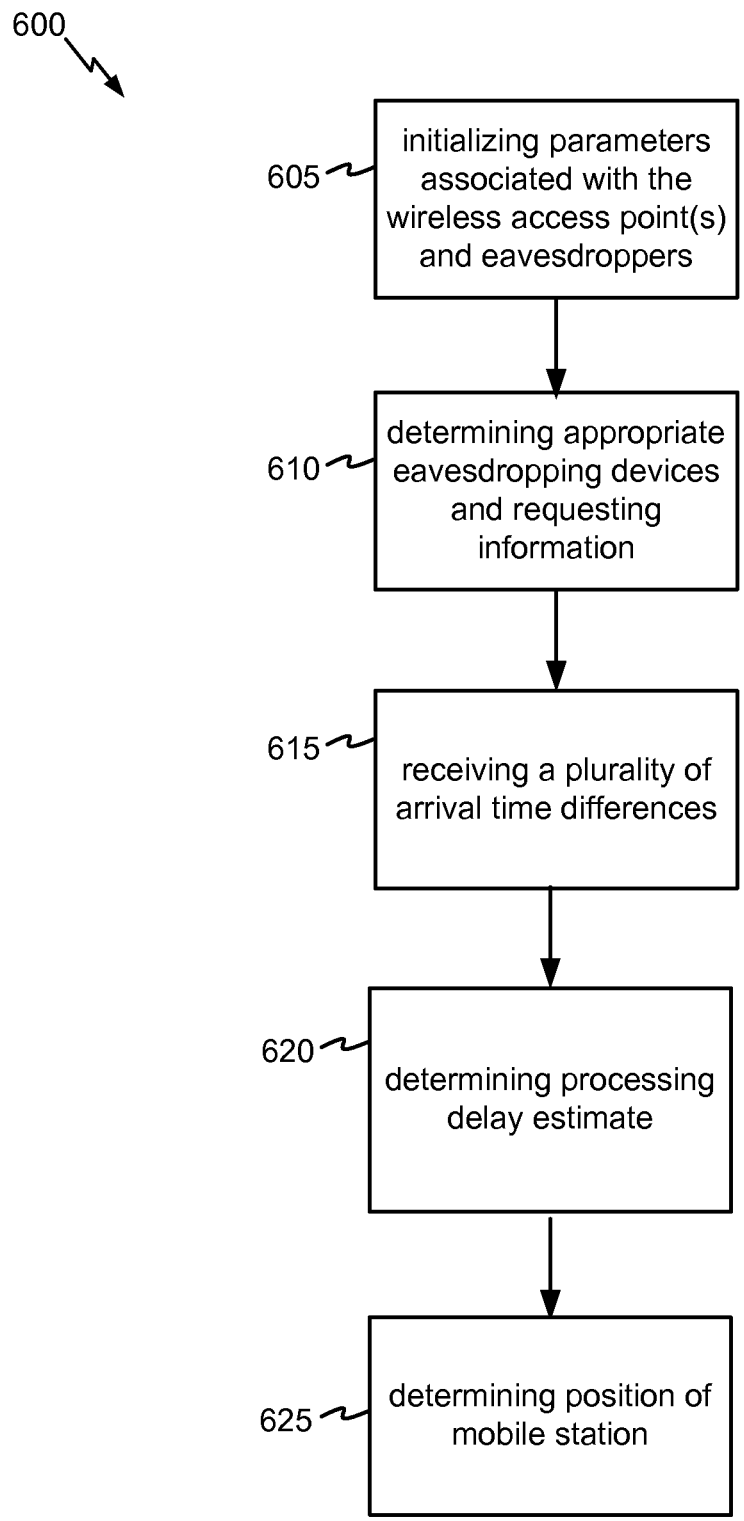
FIG. 6 shows a flowchart illustrating a method for network centric positioning which may be performed at the PDE within the back end network.

FIG. 6 illustrates an exemplary flowchart 600 illustrating a method which may be performed at the PDE 112 with the back end network. The PDE 112 may first initialize parameters associated with the LAN-WAPs and each ED 110$k$ in the network geometry (605). This may include obtaining the positions of these entities, either over the network from a database if the entities are stationary, or obtaining dynamic positioning from the entities themselves in the event they are not stationary. The PDE 112 may then coordinate activities among the ED 110$_{1-N}$, which may include determining the appropriate ED 110$k$ to obtain information from, and then requesting that the appropriate eavesdropping devices send information to the PDE 112 (610). As mentioned above, this information may include time differences, initial processing delay estimates, signal strengths, etc. An appropriate ED 110$k$ may be one which is able to receive adequate signal from the mobile station 108, based upon its relative geometry with respect to the mobile station 108 and/or other factors. The PDE 112 may then receive, from each appropriate eavesdropping device, a time difference which represents a difference in a time of arrival of a packet transmitted by the wireless access point and a time of arrival of a packet transmitted by the mobile station (615).

The PDE 112 may then determine a refined processing delay estimate for each LAN-WAP 106. The refined processing delay estimate may be based upon initial processing delay estimates, the time differences, signal strength and/or other information using any one or more of the processing delay refinement approaches described above (620). The PDE 112 may then determine a position of the mobile station 108 based upon the refined processing delay estimates and the received time differences using conventional multilateration techniques (625).

Figure 7:
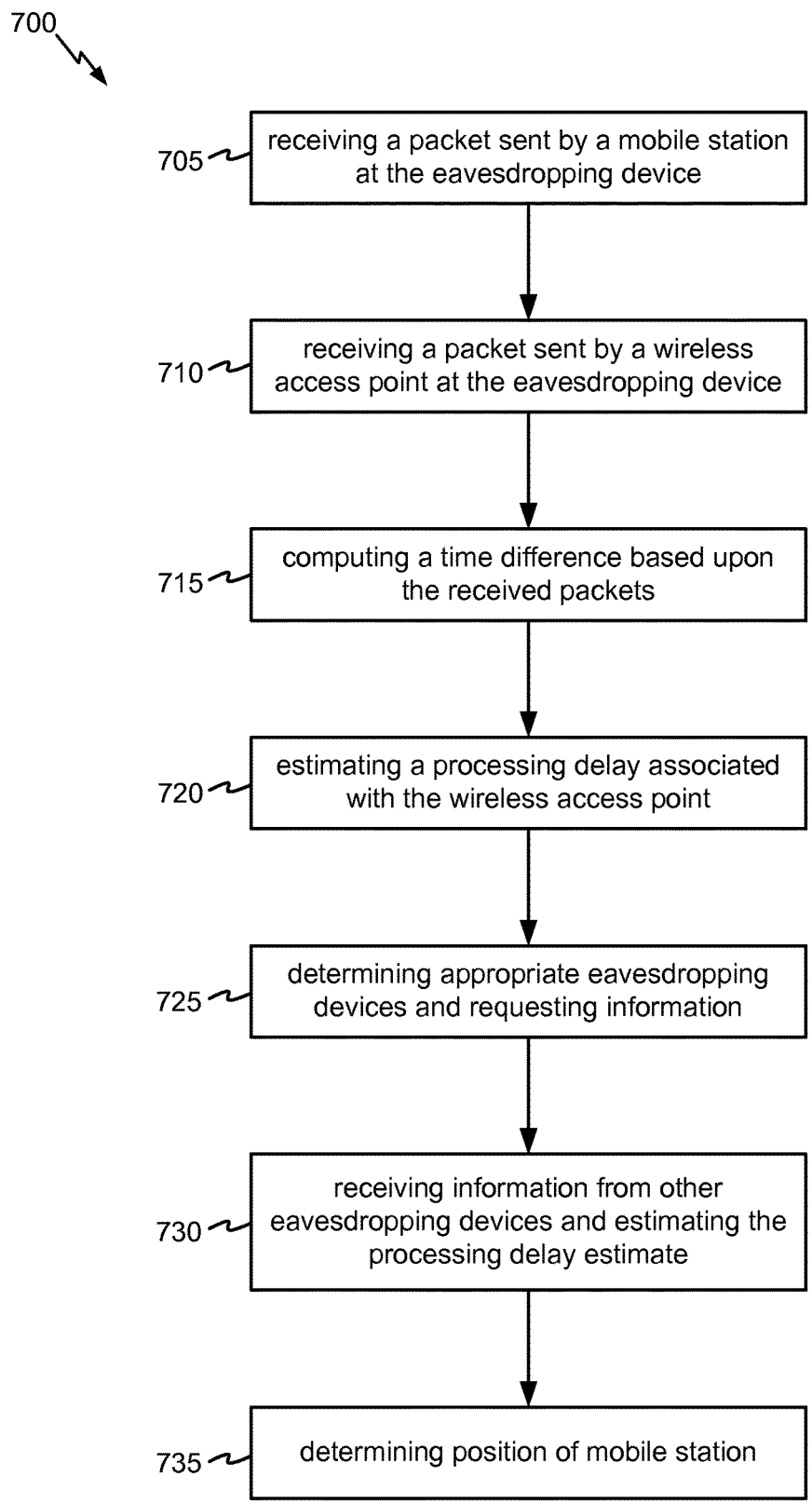
FIG. 7 shows a flowchart illustrating a method for eavesdropping and network centric position determination which may be performed by an ED residing in the local area network.

FIG. 7 shows an exemplary flowchart 700 illustrating a method which may be performed by an ED 110$k$ which also may estimate and refine the processing delay and determine the position of the mobile station 108 (e.g., also perform the functionality of PDE 112). The ED 110$k$ may first receive (eavesdrop on) a unicast packet sent by the mobile station 108 (705). The ED 110$k$ may then receive (eavesdrop on) a response packet sent by the LAN-WAP 106 (710). The ED 110$k$ may then determine the time differences of arrival of the probe and acknowledgment packets (715). The ED 110$k$ may also determine an initial estimate of a processing delay associated with the LAN-WAP 106 (720).

At this point, the ED 110$k$ may then perform functionality of the stand alone PDE 112 as described above, which may initially include determining the other appropriate EDs 110 from which to obtain information, and then send a request to have appropriate EDs 110 send information (725). The ED 110$k$ may then receive, from each appropriate eavesdropping device, a time difference which represents a difference in a time of arrival of a packet transmitted by the wireless access point and a packet transmitted by the mobile station. Additionally, the ED 110$k$ may also receive signal strength information associated with the received packets. The ED 110$k$ may then refine the processing delay estimate associated with the wireless access point (730). Once this information is obtained, the ED 110$k$ may then determine a position of the mobile station 108 based upon the refined processing delay estimate and the received time differences (735).

Figure 8:
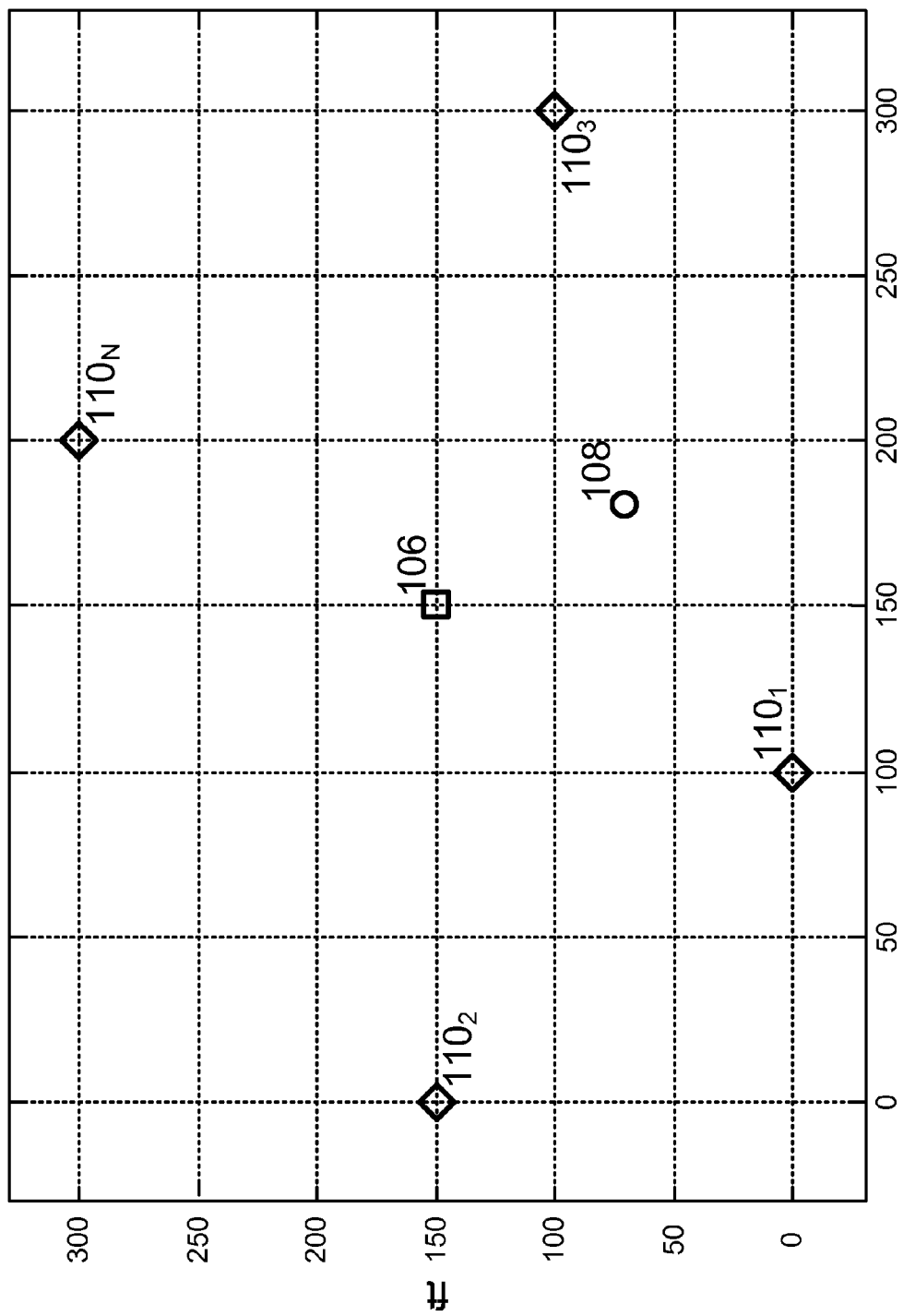
FIG. 8 shows a diagram of exemplary network geometry where the position of mobile station 108 may be determined using various embodiments of the disclosure.

FIG. 8 shows a diagram of exemplary network geometry where the position of the mobile station 108 may be determined using embodiments of the disclosure. Referring to FIG. 8, EDs $110_{1-N}$, LAN-WAP 106, and mobile station 108 are positioned on a topographical map. The topographical map is approximately 300 feet by 300 feet in dimension. Mobile station 108 may exchange packets with the LAN-WAP 106, which may be received by EDs $110_{1-3}$. However, in this example, ED $110_N$ may be out of range from mobile station 108.

Further, mobile station 108 may be positioned at location (181, 71). LAN-WAP 106 may be positioned at (150, 150); ED $110_1$ may be positioned at (100, 0); ED $110_2$ may be positioned at (0, 150); ED $110_3$ may be positioned at (300, 100); and ED $110_N$ may be positioned at (200, 300). As a result, the distance from the mobile station 108 to LAN-WAP 106 $d_0$ is equal to 85 feet; the distance from the mobile station 108 to ED $110_1$ $d_{01}$ is equal to 108 feet; the distance from the mobile station 108 to ED $110_2$ (ft) $d_{02}$ is equal to 197 feet; and the distance from the mobile station 108 to ED $110_N$ (ft) $d_{0N}$ is equal to 229 feet. These distances may be unknown to the network, since the position of the mobile station 108 may need to be determined.

In this exemplary embodiment, the processing delay $\Delta$ at LAN-WAP 106 is equal to 16325 ns. While the processing delay $\Delta$ at LAN-WAP 106 is normally unknown, for this illustration the processing delay $\Delta$ is known beforehand in order to demonstrate the accuracy of the triangle inequality estimate of the processing delay $\Delta$.

Further, each of the ED 110$k$ may measure the time difference between when the packet sent from the mobile station 108 and the packet sent from LAN-WAP 106 arrive at each of the EDs 110$k$. For example, from equation (3), the time difference at ED $110_1$ $T_1$ is equal to 16460 (ns); the time difference at ED $110_2$ $T_2$ is equal to 16362 (ns); and the time difference at ED $110_3$ $T_3$ is equal to 16446 (ns).

The distance between each of the ED 1101-N and LAN-WAP 106 can be determined from the topographical map shown in FIG. 8. For example, the distance between LAN-WAP 106 and ED 1101 is equal to 158 feet; the distance between LAN-WAP 106 and ED 1102 is equal to 150 feet; and the distance between LAN-WAP 106 and ED 1103 is equal to 158 feet. These distances may be known to the network, since the positions of LAN-WAPs are generally stationary.

Equation (8) can be utilized in two parts in order to yield an upper and a lower bound on the processing delay $\Delta$. The lower bound of the processing delay $\Delta$ can be expressed by the maximum of $\{T_k-2_{d1k}\}$. Using the values of $d_{1k}$ equal to $\{158, 150, 158\}$ and the values of $T_k$ equal to $\{16460, 16362, 16446\}$ yields $\{T_k-2_{d1k}\}=\{16143, 16062, 16130\}$. Afterwards, the maximum is taken of $\{16143, 16062, 16130\}$ yielding a lower bound of the processing delay $\Delta$ equal to 16143 ns.

The upper bound of the processing delay $\Delta$ can be expressed by the minimum of $\{T_k\}=\{16460, 16362, 16446\}$ yielding an upper bound of the processing delay $\Delta$ equal to 16362 ns.

As a result, the processing delay $\Delta$ yielded by the triangle inequality method is $16143 \leq \Delta \leq 16362$. Taking the midpoint value 16252 ns, there is a discrepancy of 73 ns compared to the actual processing delay value $\Delta$ of 16325 ns. A second refinement is to take the higher end of the range expressed in equation (8) rather than the midpoint.

It may be assumed that the mobile station 108 is closer to LAN-WAP 106 than the other EDs $110_{1-N}$ (assuming in this example the EDs may also function as LAN-WAPs) because the mobile station 108 is exchanging packets with LAN-WAP 106 and no other ED/LAN-WAPs $110_{1-N}$. Accordingly, equation (11) can be utilized to yield a highly probable lower bound on the processing delay $\Delta$. The lower bound of the processing delay $\Delta$ can be expressed by $\{T_k-d_{1k}\}$. Using the values of $d_{1k}$ equal to $\{158, 150, 158\}$ and the values of $T_k$ equal to $\{16460, 16362, 16446\}$ yields $\{T_k-d_{1k}\}=\{16302, 16212, 16288\}$. Afterwards, the maximum is taken of $\{16302, 16212, 16288\}$ yielding a lower bound of the processing delay $\Delta$ equal to 16302 ns.

The upper bound on the processing delay $\Delta$ is the minimum of $\{T_k\}=\{16460, 16362, 16446\}$ yielding an upper bound of 16362 ns. As a result, the processing delay $\Delta$ is likely between 16302 and 16362 ns. When compared to the actual processing delay value $\Delta$ of 16325 ns the error is at most 37 ns, which is less than the 73 ns obtained using the triangle inequality alone.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The methodologies described herein may be implemented by various means depending upon the application. For example, these methodologies may be implemented in hardware, firmware, software, or any combination thereof. For a hardware implementation, the processors/processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor/processing unit. Memory may be implemented within the processor/processing unit or external to the processor/processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), hard disk, floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors/processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of preparing data for determining a position of a mobile station, comprising:
   receiving information from a plurality of eavesdropping devices, the information from each respective one of the plurality of eavesdropping devices comprising signal strength information of a respective signal received at the respective one of the plurality of eavesdropping devices from each of the mobile station and a wireless access point;
   selecting a subset of the plurality of eavesdropping devices based at least in part on the signal strength information, the subset of the plurality of eavesdropping devices comprising at least three of the plurality of eavesdropping devices;
   obtaining information, from each respective eavesdropping device of the subset of the plurality of eavesdropping devices, the information comprising an indication of a time difference representing a difference in a time of arrival at the respective eavesdropping device of a respective initial packet sent by the mobile station and a time of arrival of a respective response packet sent by the wireless access point responsive to the respective initial packet;
   determining a refined processing delay based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and
   determining the position of the mobile station based upon the refined processing delay and the time differences from the subset of the plurality of eavesdropping devices.

2. The method according to claim 1, further comprising:
   measuring a first arrival time corresponding to the initial packet; and
   measuring a second arrival time corresponding to the response packet;
   wherein preparing the indication of the time difference comprises computing a difference between the second arrival time and the first arrival time.

3. The method according to claim 1, wherein the eavesdropping device comprises a wireless access point.

4. The method according to claim 1, wherein obtaining the information further comprises:
   sending a request to the plurality of eavesdropping devices for the information.

5. The method according to claim 1, further comprising:
   bounding the refined processing delay based upon the time differences from the subset of the plurality of eavesdropping devices.

6. The method according to claim 5, wherein the refined processing delay is bound by a triangle inequality.

7. The method of claim 1, further comprising providing the position of the mobile station to a position determination entity.

8. The method according to claim 1, further comprising:
   measuring a first arrival time corresponding to the initial packet; and measuring a second arrival time corresponding to the response packet;

wherein prepare the indication of the time difference comprises computing a difference between the second arrival time and the first arrival time; and wherein the eavesdropping device comprises a wireless access point.

9. The method of claim 1, wherein at least one of the plurality of eavesdropping devices is a mobile station operating in a peer-to-peer networking mode, and wherein the information from each respective at least one of the plurality of eavesdropping devices includes position information associated with a position of the respective at least one of the plurality of eavesdropping devices.

10. The method of claim 1, wherein determining a refined processing delay based upon the indications of the time differences from the subset of the plurality of eavesdropping devices by combining the information received from each of the subset of the plurality of eavesdropping devices comprises determining a processing delay estimate for each of the indications of the time differences by estimating an amount of time that the wireless access point took to process a respective initial packet from the mobile station and to generate the respective response packet and by combining the processing delay estimates to determine the refined processing delay.

11. A method for determining a position of a mobile station, comprising:

receiving information from a plurality of eavesdropping devices, the information from each respective one of the plurality of eavesdropping devices comprising signal strength information of a respective signal received at the respective one of the plurality of eavesdropping devices from each of the mobile station and the wireless access point;

selecting a subset of the plurality of eavesdropping devices based at least in part on the signal strength information, the subset of the plurality of eavesdropping devices comprising at least three of the plurality of eavesdropping devices;

sending a request to each eavesdropping device of the subset of the plurality of eavesdropping devices for an indication of a time difference which represents a difference in a time of arrival at the respective eavesdropping device of a response packet sent by a wireless access point and a time of arrival at the respective eavesdropping device of an initial packet sent by the mobile station;

receiving, only from each of the subset of the plurality of eavesdropping devices, the indication of the time difference;

determining a refined processing delay estimate associated with the wireless access point based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and determining the position of the mobile station based upon the refined processing delay estimate and the time differences from the subset of the plurality of eavesdropping devices.

12. The method according to claim 11, wherein the processing delay estimate is bound by a triangle inequality.

13. The method according to claim 11, wherein determining the processing delay estimate further comprises:

determining a relative geometry of the mobile station and the wireless access point relative to one of the subset of the plurality of eavesdropping devices;

determining a range for the processing delay estimate by using the time differences from the subset of the plurality of eavesdropping devices in a triangle inequality; and selecting a value from the range, as a refined processing delay, based upon the relative geometry.

14. The method according to claim 13, wherein selecting the value from the range further comprises selecting the value from an upper end of the range;

wherein the relative geometry is substantially collinear; and wherein the wireless access point is between the mobile station and the eavesdropping device, or the mobile station is between the wireless access point and the eavesdropping device.

15. The method according to claim 13, wherein selecting the value from the range further comprises selecting the value from a lower end of the range;

wherein the relative geometry is substantially collinear, and wherein the eavesdropping device is between the mobile station and the wireless access point.

16. The method according to claim 11, wherein determining the processing delay estimate further comprises:

receiving, from each of the plurality of eavesdropping devices, a signal strength value associated with the initial packet sent by the mobile station; and bounding a distance between each of the plurality of eavesdropping devices and the mobile station based upon the signal strength values.

17. The method according to claim 11, wherein determining the processing delay estimate further comprises:

determining a range for a distance between the mobile station and each of the subset of the plurality of eavesdropping devices based upon signal strength values from the plurality of eavesdropping devices;

setting an estimated distance between the mobile station and each of the subset of the plurality of eavesdropping devices as a midpoint of the range;

calculating the position of the mobile station using trilateration based upon the estimated distance;

calculating a first distance between the mobile station and the wireless access point, and a second distance between the mobile station and each of the subset of the plurality of eavesdropping devices, based upon the calculated position of the mobile station; and refining the processing delay estimate based upon the calculated first and second distances and the time differences.

18. The method according to claim 11, wherein determining the processing delay estimate further comprises:

calculating a first distance estimate between the mobile station and the wireless access point based upon a previous position of the mobile station;

calculating a second distance estimate between the mobile station and the subset of the plurality of eavesdropping devices based upon the previous position of the mobile station;

determining processing delay estimates based upon the first distance estimate and each second distance estimate; and refining a processing delay estimate by combining the processing delay estimates.

19. The method according to claim 11, wherein determining the position of the mobile station further comprises:

adjusting each time difference using the processing delay estimate;

determining distance differences by subtracting a distance between the wireless access point and each of the subset of the plurality of eavesdropping device from the adjusted time differences; and performing multilateration using the distance differences to estimate the position of the mobile station.

20. An apparatus for preparing data for determining a position of a mobile station, comprising:

a wireless transceiver;

a processor coupled to the wireless transceiver; and a memory coupled to the processor, wherein the memory stores executable instructions and data for causing the processor to:

receive information from a plurality of eavesdropping devices, the information from each respective one of the plurality of eavesdropping devices comprising signal strength information of a respective signal received at the respective one of the plurality of eavesdropping devices from each of the mobile station and the wireless access point;

select a subset of the plurality of eavesdropping devices based at least in part on the signal strength information, the subset of the plurality of eavesdropping devices comprising at least three of the plurality of eavesdropping devices;

obtain information, from each respective eavesdropping device of the subset of the plurality of eavesdropping devices, the information comprising an indication of a time difference representing a difference in a time of arrival at the respective eavesdropping device of a respective initial packet sent by the mobile station and a time of arrival of a respective response packet sent by the wireless access point responsive to the respective initial packet;

determine a refined processing delay based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and determine the position of the mobile station based upon the refined processing delay and the time differences from the subset of the plurality of eavesdropping devices.

21. The apparatus according to claim 20, wherein the instructions further cause the processor to enable each of the plurality of eavesdropping devices to:

measure a first arrival time corresponding to the initial packet, and measure a second arrival time corresponding to the response packet, wherein the instructions for causing the processor to enable only each of the subset of the plurality of eavesdropping devices to prepare the indication of the time difference comprises instructions for causing the processor to enable only each of the plurality of eavesdropping devices to compute a difference between the second arrival time and the first arrival time.

22. The apparatus according to claim 20, wherein each of the plurality of eavesdropping devices comprises a wireless access point.

23. The apparatus according to claim 20, wherein the instructions to obtain the information further comprise instructions to cause the processor to:

send a request to the plurality of eavesdropping devices.

24. The apparatus according to claim 20, wherein the instructions further cause the processor to:

bound the refined processing delay based upon the time differences from the subset of the plurality of eavesdropping devices.

25. The apparatus according to claim 24 wherein the refined processing delay is bound by a triangle inequality.

26. The apparatus of claim 20, the instructions configured to cause the processor to determine a refined processing delay based upon the indications of the time differences from the subset of the plurality of eavesdropping devices by combining the information received from each of the subset of the plurality of eavesdropping devices further comprise instructions configured to cause the processor to determine a processing delay estimate for each of the indications of the time differences by estimating an amount of time that the wireless access point took to process a respective initial packet from the mobile station and to generate the respective response packet and by combining the processing delay estimates to determine the refined processing delay.

27. An apparatus for determining a position of a mobile station, comprising:

a network interface;

a processor coupled to the network interface; and a memory coupled to the processor, wherein the memory stores executable instructions and data for causing the processor to:

receive information from a plurality of eavesdropping devices, the information from each respective one of the plurality of eavesdropping devices comprising signal strength information of a respective signal received at the respective one of the plurality of eavesdropping devices from each of the mobile station and a wireless access point;

select a subset of the plurality of eavesdropping devices based at least in part on the signal strength information, the subset of the plurality of eavesdropping devices comprising at least three of the plurality of eavesdropping devices;

send a request to each eavesdropping device of the subset of the plurality of eavesdropping devices for an indication of a time difference which represents a difference in a time of arrival at the respective eavesdropping device of a response packet sent by a wireless access point and a time of arrival at the respective eavesdropping device of an initial packet sent by the mobile station;

receive, from only each of the subset of the plurality of eavesdropping devices, the indication of the time difference;

determine a refined processing delay estimate associated with the wireless access point based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and determine the position of the mobile station based upon the refined processing delay estimate and the time differences from the subset of the plurality of eavesdropping devices.

28. The apparatus according to claim 27, wherein processing delay estimate is bound by a triangle inequality.

29. The apparatus according to claim 27, wherein the instructions to determining the processing delay estimate comprises instructions to:

determine a relative geometry of the mobile station and the wireless access point relative to one of the subset of the plurality of eavesdropping devices, determine a range for the processing delay estimate by using the time differences from the plurality of eavesdropping devices in a triangle inequality, and select a value from the range, as a refined processing delay, based upon the relative geometry.

30. The apparatus according to claim 29, the instructions to select the value from the range further comprises instructions to select the value from an upper end of the range;

wherein the relative geometry is substantially collinear; and wherein the wireless access point is between the mobile station and an eavesdropping device of the plurality of eavesdropping devices, or the mobile station is between the wireless access point and an eavesdropping device of the subset of the plurality of eavesdropping devices.

31. The apparatus according to claim 29, the instructions to select the value from the range further comprises instructions to select the value from a lower end of the range;

wherein the relative geometry is substantially collinear, and wherein an eavesdropping device of the subset of the plurality of eavesdropping devices is between the mobile station and the wireless access point.

32. The apparatus according to claim 27, wherein the instructions to determine the processing delay estimate causes the processor to:

receive, from each of the subset of the plurality of eavesdropping devices, a signal strength value associated with the initial packet sent by the mobile station; and bound a distance between each of the subset of the plurality of eavesdropping devices and the mobile station based upon the signal strength values.

33. The apparatus according to claim 27, wherein the instructions to determine the processing delay estimate causes the processor to:

determine a range for a distance between the mobile station and each of the subset of the plurality of eavesdropping devices based upon signal strength values from the plurality of eavesdropping devices, set an estimated distance between the mobile station and each of the subset of the plurality of eavesdropping devices as a midpoint of the range, calculate the position of the mobile station using trilateration based upon the estimated distance, calculate a first distance between the mobile station and the wireless access point, and a second distance between the mobile station and each of the subset of the plurality of eavesdropping devices, based upon the calculated position of the mobile station, and refine the processing delay estimate based upon the calculated first and second distances and the time differences.

34. The apparatus according to claim 27, wherein the instructions to determine the processing delay estimate causes the processor to:

calculate a first distance estimate between the mobile station and the wireless access point based upon a previous position of the mobile station, calculate a second distance estimate between the mobile station and the subset of the plurality of eavesdropping devices based upon the previous position of the mobile station, determine processing delay estimates based upon the first distance estimate and each second distance estimate, and refine a processing delay estimate by combining the processing delay estimates.

35. The apparatus according to claim 27, wherein the instructions to determine the position of the mobile station causes the processor to:

adjust each time difference using the processing delay estimate, determine distance differences by subtracting a distance between the wireless access point and each eavesdropping device of the subset of the plurality of eavesdropping devices from the adjusted time differences, and perform multilateration using the distance differences to estimate the position of the mobile station.

36. An apparatus for preparing data for determining a position of a mobile station, comprising:

means for receiving information from a plurality of eavesdropping devices, the information from each respective one of the plurality of eavesdropping devices comprising signal strength information of a respective signal received at the respective one of the plurality of eavesdropping devices from each of the mobile station and a wireless access point;

means for selecting a subset of the plurality of eavesdropping devices based at least in part on the signal strength information, the subset of the plurality of eavesdropping devices comprising at least three of the plurality of eavesdropping devices;

means for obtaining information, from each respective eavesdropping device of the subset of the plurality of eavesdropping devices, the information comprising an indication of time difference representing a difference in a time of arrival at the respective eavesdropping device of a respective initial packet sent by the mobile station and a time of arrival of a respective response packet sent by the wireless access point responsive to the respective initial packet;

means for determining a refined processing delay based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and means for determining the position of the mobile station based upon the refined processing delay and the time differences from the subset of the plurality of eavesdropping devices.

37. The apparatus according to claim 36, further comprising:
means for measuring a first arrival time corresponding to the initial packet; and
means for measuring a second arrival time corresponding to the response packet;
wherein the means for preparing the indication of the time difference comprises means for determining a difference between the second arrival time and the first arrival time.

38. The apparatus of claim 36, wherein the means for determining a refined processing delay based upon the indications of the time differences from the subset of the plurality of eavesdropping devices by combining the information received from each of the subset of the plurality of eavesdropping devices comprise means for determining a processing delay estimate for each of the indications of the time differences by estimating an amount of time that the wireless access point took to process a respective initial packet from the mobile station and to generate the respective response packet and by combining the processing delay estimates to determine the refined processing delay.

39. An apparatus for determining a position of a mobile station, comprising:
means for receiving information from a plurality of eavesdropping devices, the information from each respective one of the plurality of eavesdropping devices comprising signal strength information of a respective signal received at the respective one of the plurality of eavesdropping devices from each of the mobile station and a wireless access point;
means for selecting a subset of the plurality of eavesdropping devices based at least in part on the signal strength information, the subset of the plurality of eavesdropping devices comprising at least three of the plurality of eavesdropping devices;
means for sending a request to each eavesdropping device of the subset of the plurality of eavesdropping devices for an indication of a time difference which represents a difference in a time of arrival at the respective eavesdropping device of a response packet sent by a wireless access point and a time of arrival at the respective eavesdropping device of an initial packet sent by the mobile station;
means for receiving, from only each of the subset of the plurality of eavesdropping devices, the indication of a time difference;
means for determining a refined processing delay estimate associated with the wireless access point based upon the indications of the time differences from the subset of the plurality of eavesdropping devices by combining the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and
means for determining the position of the mobile station based upon the refined processing delay estimate and the time differences from the subset of the plurality of eavesdropping devices.

40. The apparatus according to claim 39, wherein the means for determining the processing delay estimate further comprises:
means for determining a relative geometry of the mobile station and the wireless access point relative to one of the subset of the plurality of eavesdropping devices;
means for determining a range for the processing delay estimate by using the time differences from the subset of the plurality of eavesdropping devices in a triangle inequality; and
means for selecting a value from the range, as a refined processing delay, based upon the relative geometry.

41. The apparatus according to claim 40, wherein the means for selecting the value from the range comprises selecting the value from an upper end of the range;
wherein the relative geometry is substantially collinear, and
wherein the wireless access point is between the mobile station and the eavesdropping device, or the mobile station is between the wireless access point and the eavesdropping device.

42. The apparatus according to claim 39, wherein the means for determining the processing delay estimate further comprises:
means for receiving, from each of the subset of the plurality of eavesdropping devices, a signal strength value associated with the initial packet sent by the mobile station; and
means for bounding a distance between each of the plurality of eavesdropping devices and the mobile station based upon the signal strength values.

43. The apparatus according to claim 39, wherein the means for determining the processing delay estimate further comprises:
means for determining a range for a distance between the mobile station and each of the subset of the plurality of eavesdropping devices based upon received signal strength values from the plurality of eavesdropping devices;
means for setting an estimated distance between the mobile station and each of the subset of the plurality of eavesdropping devices as a midpoint of the range;
means for calculating the position of the mobile station using trilateration based upon the estimated distance;
means for calculating a first distance between the mobile station and the wireless access point, and a second distance between the mobile station and each of the subset of the plurality of eavesdropping devices, based upon the calculated position of the mobile station; and
means for refining the processing delay estimate based upon the calculated first and second distances and the time differences.

44. The apparatus according to claim 39, wherein the means for determining the processing delay estimate further comprises:
 means for calculating a first distance estimate between the mobile station and the wireless access point based upon a previous position of the mobile station;
 means for calculating a second distance estimate between the mobile station and the subset of the plurality of eavesdropping devices based upon the previous position of the mobile station;
 means for determining processing delay estimates based upon the first distance estimate and each second distance estimate; and
 means for refining a processing delay estimate by combining the processing delay estimates.

45. The apparatus according to claim 39, wherein the means for determining the position of the mobile station further comprises:
 means for adjusting each time difference using the processing delay estimate;
 means for determining distance differences by subtracting a distance between the wireless access point and each eavesdropping device from the adjusted time differences; and
 means for performing multilateration using the distance differences to estimate the position of the mobile station.

46. A non-transitory machine-readable medium for preparing data for determining a position of a mobile station, comprising instructions, which, when executed by a machine, cause the machine to perform operations, the instructions comprising:
 instructions to receive information from a plurality of eavesdropping devices, the information from each respective one of the plurality of eavesdropping devices comprising signal strength information of a respective signal received at the respective one of the plurality of eavesdropping devices from each of the mobile station and a wireless access point;
 instructions to select a subset of the plurality of eavesdropping devices based at least in part on the signal strength information, the subset of the plurality of eavesdropping devices comprising at least three of the plurality of eavesdropping devices;
 instructions to obtain information from each respective eavesdropping device of the subset of the plurality of eavesdropping devices, the information comprising an indication of time difference representing a difference in a time of arrival at the respective eavesdropping device of a respective initial packet sent by the mobile station and a time of arrival of a respective response packet sent by the wireless access point responsive to the respective initial packet;
 instructions to determine a refined processing delay based upon the indications of the time differences from the plurality of eavesdropping device, the instructions configured to cause the machine to determine the refined processing delay comprising instructions configured to cause the machine to combine the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and
 instructions to determine the position of the mobile station based upon the refined processing delay and the time differences from the plurality of eavesdropping devices.

47. The non-transitory machine-readable medium of claim 46, wherein the instructions to determine a refined processing delay based upon the indications of the time differences from the plurality of eavesdropping device, the instructions configured to cause the machine to determine the refined processing delay comprise instructions configured to cause the machine to combine the information received from each of the subset of the plurality of eavesdropping devices further comprise instructions to determine a processing delay estimate for each of the indications of the time differences by estimating an amount of time that the wireless access point took to process a respective initial packet from the mobile station and to generate the respective response packet and instructions configured to cause the machine to combine the processing delay estimates to determine the refined processing delay.

48. A non-transitory machine-readable medium for preparing data for determining a position of a mobile station, comprising instructions, which, when executed by a machine, cause the machine to perform operations, the instructions comprising:
 instructions to receive information from a plurality of eavesdropping devices, the information from each respective one of the plurality of eavesdropping devices comprising signal strength information of a respective signal received at the respective one of the plurality of eavesdropping devices from each of the mobile station and a wireless access point;
 instructions to select a subset of the plurality of eavesdropping devices based at least in part on the signal strength information, the subset of the plurality of eavesdropping devices comprising at least three of the plurality of eavesdropping devices;
 instructions to send a request to each eavesdropping device of the subset of the plurality of eavesdropping devices for an indication of a time difference which represents a difference in a time of arrival at the respective eavesdropping device of a response packet sent by a wireless access point and a time of arrival at the respective eavesdropping device of an initial packet sent by the mobile station;
 instructions to receive, only from each of the subset of the plurality of eavesdropping devices, the indication of the time difference;
 instructions to determine a refined processing delay estimate associated with the wireless access point based upon the indications of the time differences from the subset of the plurality of eavesdropping devices, the instructions configured to cause the machine to determine the refined processing delay comprising instructions configured to cause the machine to combine the information received from each of the subset of the plurality of eavesdropping devices, the information received comprises processing delay estimates computed by each of the plurality of eavesdropping devices, wherein each processing delay estimate represents an estimated amount of time that the wireless access point took to process a respective initial packet from the mobile station and to generate the respective response packet; and instructions to determine the position of the mobile station based upon the processing delay estimate and the time differences from the subset of the plurality of eavesdropping devices.

49. The non-transitory machine-readable medium according to claim 48, wherein the instructions to determine the processing delay estimate further comprise:
   instructions to determine a relative geometry of the mobile station and the wireless access point relative to one of the subset of the plurality of eavesdropping devices;
   instructions to determine a range for the processing delay estimate by using the time differences from the subset of the plurality of eavesdropping devices in a triangle inequality; and
   instructions to select a value from the range, as the refined processing delay, based upon the relative geometry.

50. The non-transitory machine-readable medium according to claim 49, wherein the instructions to select the value from the range further comprises:
   selecting the value from an upper end of the range;
   wherein the relative geometry is substantially collinear, and
   wherein the wireless access point is between the mobile station and the eavesdropping device, or the mobile station is between the wireless access point and the eavesdropping device.

51. The non-transitory machine-readable medium according to claim 48, wherein the instructions to determine the processing delay estimate further comprise:
   instructions to receive, from each of the subset of the plurality of eavesdropping devices, a signal strength value associated with the initial packet sent by the mobile station; and
   instructions to bound a distance between each of the subset of the plurality of eavesdropping devices and the mobile station based upon the signal strength values.

52. The non-transitory machine-readable medium according to claim 48, wherein the instructions to determine the processing delay estimate further comprise:
   instructions to determine a range for a distance between the mobile station and each of the subset of the plurality of eavesdropping devices based upon received signal strength values from the plurality of eavesdropping devices;
   instructions to set an estimated distance between the mobile station and each of the subset of the plurality of eavesdropping devices as a midpoint of the range;
   instructions to calculate the position of the mobile station using trilateration based upon the estimated distances;
   instructions to calculate a first distance between the mobile station and the wireless access point, and a second distance between the mobile station and each of the subset of the plurality of eavesdropping devices, based upon the calculated position of the mobile station; and
   instructions to refine the processing delay estimate based upon the calculated first and second distances and the time differences.

53. The non-transitory machine-readable medium according to claim 48, wherein the instructions to determine the processing delay estimate further comprise:
   instructions to calculate a first distance estimate between the mobile station and the wireless access point based upon a previous position of the mobile station;
   instructions to calculate a second distance estimate between the mobile station and the subset of the plurality of eavesdropping devices based upon the previous position of the mobile station;
   instructions to determine processing delay estimates based upon the first distance estimate and each second distance estimate; and
   instructions to refine a processing delay estimate by combining the processing delay estimates.

54. The non-transitory machine-readable medium according to claim 48, wherein the instructions to determine the position of the mobile station further comprise:
   instructions to adjust each time difference using the processing delay estimate;
   instructions to determine distance differences by subtracting a distance between the wireless access point and each eavesdropping device from the adjusted time differences; and
   instructions to perform multilateration using the distance differences to estimate the position of the mobile station.

* * * * *